US012655164B2

(12) United States Patent
Fabulyak et al.

(10) Patent No.: US 12,655,164 B2
(45) Date of Patent: Jun. 16, 2026

(54) ORGANOMETALLIC COMPOUNDS FOR THE DEPOSITION OF HIGH PURITY TIN OXIDE AND DRY ETCHING OF THE TIN OXIDE FILMS AND DEPOSITION REACTORS

(71) Applicant: SEASTAR CHEMICALS ULC, Sidney (CA)

(72) Inventors: Diana Fabulyak, Victoria (CA); Rajesh Odedra, Altrincham (GB); Wesley Phillip Graff, Singapore (SG); Shaun Cembella, Victoria (CA); Cassidy Conover, Saanich (CA)

(73) Assignee: SEASTAR CHEMICALS ULC, Sidney (CA)

( * ) Notice: Subject to any disclaimer, the term of this patent is extended or adjusted under 35 U.S.C. 154(b) by 1092 days.

(21) Appl. No.: 17/637,782

(22) PCT Filed: Aug. 28, 2020

(86) PCT No.: PCT/IB2020/058069

§ 371 (c)(1),
(2) Date: Feb. 23, 2022

(87) PCT Pub. No.: WO2021/038523

PCT Pub. Date: Mar. 4, 2021

(65) Prior Publication Data

US 2022/0306657 A1 Sep. 29, 2022

Related U.S. Application Data

(63) Continuation of application No. 16/575,605, filed on Sep. 19, 2019, now abandoned.

(30) Foreign Application Priority Data

Aug. 29, 2019 (SG) .......................... 10201907997R

(51) Int. Cl.
*C07F 7/22* (2006.01)

(52) U.S. Cl.
CPC .......... *C07F 7/2288* (2013.01); *C07F 7/2224* (2013.01)

(58) Field of Classification Search
CPC .... C07F 7/2284; C07F 7/2224; C07F 7/2288; C07F 7/2296
See application file for complete search history.

(56) References Cited

U.S. PATENT DOCUMENTS

| | | | |
|---|---|---|---|
| 4,108,990 | A | 8/1978 | Plum et al. |
| 8,703,237 | B2 | 4/2014 | Park et al. |
| 9,085,594 | B2 | 7/2015 | Modtland et al. |
| 2004/0014327 | A1 | 1/2004 | Ji et al. |
| 2004/0033698 | A1 | 2/2004 | Lee et al. |
| 2007/0117994 | A1 | 5/2007 | Shenai-Khatkhate et al. |
| 2009/0236745 | A1 | 9/2009 | Vrtis et al. |
| 2015/0218695 | A1 | 8/2015 | Odedra |
| 2017/0102612 | A1 | 4/2017 | Meyers et al. |
| 2018/0155372 | A1 | 6/2018 | Ryu et al. |
| 2019/0337969 | A1 | 11/2019 | Odedra et al. |
| 2020/0223877 | A1 | 7/2020 | Odedra et al. |
| 2021/0214379 | A1 | 7/2021 | Odedra et al. |

FOREIGN PATENT DOCUMENTS

| | | | | |
|---|---|---|---|---|
| CA | 1312700 | C | | 1/1993 |
| CA | 2920646 | A1 | | 8/2017 |
| CA | 2975104 | A1 | | 2/2019 |
| CN | 102810483 | A | | 12/2012 |
| CN | 104853855 | A | | 8/2015 |
| CN | 109988189 | A | | 7/2019 |
| JP | 62-182279 | A | | 8/1987 |
| JP | 62-280336 | A | | 12/1987 |
| JP | 2008-091215 | A | | 4/2008 |
| JP | 2018095587 | A | * | 6/2018 |
| KR | 10-2013-0037569 | A | | 4/2013 |
| WO | WO-2014094103 | A1 | | 6/2014 |
| WO | 2014/194103 | A2 | | 12/2014 |
| WO | WO-2016/065120 | A1 | | 4/2016 |
| WO | 2019/023797 | A1 | | 2/2019 |

OTHER PUBLICATIONS

CAS Abstract and Indexed Compound, R. Mehrotra et al., 5 Indian Journal of Chemistry, 643-645 (1967) (Year: 1967).*
T. Gans-Eichler et al., 41 Angewandte Chemie, International Edition, 1888-1891 (2002) (Year: 2002).*
CAS Abstract and Indexed Compounds, T. Hatakeyama et al., JP 2018095587 (2018) (Year: 2018).*
CAS Abstract, RN 474316-57-9 (2002) (Year: 2002).*
CAS Abstract and Indexed Compound, T. Gans-Eichler et al., 41 Angewandte Chemie, International Edition, 1888-1891 (2002) ( Year: 2002).*
Jones, K et al., "Amino-derivatives of Metals and Metalloids. Part I. Preparation of Aminostannanes, Stannylamines, and Stannazanes," Journal of the Chemical Society, Mar. 1965, pp. 1944-1951.
Jones, K. et al., "Aminostannanes, Stannylamines, and Stannazanes," Proceedings of the Chemical Society, London, Nov. 1962, pp. 358-359.
Shane Harrypersad et al., "Alternating polystannanes: syntheses and properties," Chemical Communications, Jan. 2015, pp. 7120-7123, vol. 51, No. 33.

(Continued)

*Primary Examiner* — Alexander R Pagano
(74) *Attorney, Agent, or Firm* — Faegre Drinker Biddle & Reath LLP

(57) ABSTRACT

Specific organometallic compounds of Formula I: $Q_x$-Sn-$(A^1R^{1'}{}_z)_{4-x}$ or Formula II: $Sn(NR^2(CH_2)_nA^2)_2$ useful for the deposition of high purity tin oxide, as well as methods of using such compounds are disclosed. Also disclosed are compositions of organometallic compounds useful for the deposition of high purity tin oxide that in combination improve stability. Also disclosed are processes for dry etching tin oxide with a particular etchant gas and/or a process for dry etching a substrate using a particular etchant gas with a specific additive.

13 Claims, 14 Drawing Sheets

(56) References Cited

OTHER PUBLICATIONS

B. Jousseaume, "Product Subclass 14: Organostannylamines and Related Compounds," Science of Synthesis, Jan. 2003, pp. 401-408, vol. 5, No. 2.
Randall, E. W et al., "Nuclear Magnetic Resonance Studies of Exchange in Stannylamines," *Journal of the American Chemical Society*, Jul. 5, 1967, vol. 89 (14), pp. 3438-3441.
Laurent, J. M. et al., "Morphology and physical properties of $SnO_2$-based thin films deposited by the pyrosol process from dibutyltindiacetate," *Thin Solid Films*, vol. 292 (1-2), Jan. 5, 1997, pp. 145-149.
Barone, G. et al., "Structural distortions in homoleptic $(RE)_4A$ (E=O, S, Se; A=C, Si, Ge, Sn): implications for the CVD of tin sulfides"—*J. Chem. Soc., Dalton Trans.*, 2001, pp. 3435-3445.
Written Opinion of the International Preliminary Examining Authority mailed Jul. 2, 2019 issued in International patent application No. PCT/CA2018/050933.
International Preliminary Report on Patentability (IPRP) mailed Oct. 18, 2019 issued in international patent application No. PCT/CA2018/050933.
Rajesh Odedra, et al., "Organometallic Compounds and Purification of Such Organometallic Compounds," as filed U.S. Appl. No. 16/834,361, filed Mar. 30, 2020, 48 pages.
Jones et al. Proceedings of the Chemical Society, 1962, 258-359.
Lober Th, J, "Cleavage of the tin-nitrogen bond. (Dialkylamino)stannanes and their reactions with alkylating agents". Journal of Organometallic Chemistry, 1969, vol. 16 (2), pp. 235-248.
Kennedy, JD et al, "ndirect nuclear spin spin coupling constants oftin-119 and lead-207 to nitrogen and phosphorus in organometallic compounds". Journal of Organometallic Chemistry, 1980, vol. 195 (3), pp. 285-290.
Restriction Requirement Office Action mailed Jun. 25, 2020 for related U.S. Appl. No. 16/575,605.
Lorberth, "Spaltung Der Zinn-Stickstoff-Bindung (Dialkylamino) Stannane Und Ihre Reaktionen Mit Alkylierungsmitteln", Journal of Organomecallic Chemistry, vol. 16, No. 1, Oct. 18, 1968, pp. 235-248.
Search Report received for Taiwan Patent Application No. TW 109129780, mailed on May 3, 2024, 1 pages.
Smith et al., "Cyclometalatlon of o-Arylphenoxlde and Alkoxlde Ligands at TIn(IV) Metal Centers: Reaction Scope and Product Characterization", OrganometaUics, vol. 11, Sep. 13, 1991, pp. 1064-1071.
Smith et al., "Synthesis, Structure, and Spectroscopic Properties of Germanium and Tin Compounds Containing Aryloxide Ligation: Comparison of Aryloxide Bonding to Group 4 and Group 14 Metal Centers", Depertment of Chemistry, Jan. 18, 1990, pp. 1-7.
CN Office Action Mailed on Jun. 29, 2023 for CN Application No. 202080061270, 16 page(s).
International Preliminary Report on Patentability received for PCT Patent Application No. PCT/IB2020/058069, mailed on Jan. 26, 2022, 4 pages.
International Search Report and Written Opinion received for PCT Patent Application No. PCT/IB2020/058069, mailed on Nov. 26, 2020, 10 pages.
Michiko et al., "Reactions of anthrone with nontransition metal and transition metal amides and thiolates", Nippon Kagaku Kaishi, Jun. 1, 1986, vol. 6, pp. 796-800 (with English Abstract).

* cited by examiner

ORGANOMETALLIC COMPOUNDS FOR THE DEPOSITION OF HIGH PURITY TIN OXIDE AND DRY ETCHING OF THE TIN OXIDE FILMS AND DEPOSITION REACTORS

CROSS-REFERENCE TO PRIOR APPLICATIONS

This application is a national stage entry of International Application No. PCT/IB2020/058069 filed Aug. 28, 2020, which claims benefit of Singapore Patent Application No. 10201907997R filed Aug. 29, 2019 and U.S. application Ser. No. 16/575,605 filed Sep. 19, 2019, both of which are herein incorporated by reference in their entirety.

TECHNICAL FIELD

The present disclosure relates to organometallic compounds useful for the deposition of high purity tin oxide, and a dry etching process for dry etching such high purity tin oxide films and the deposition reactors used in tin oxide film deposition methods. More specifically, the present disclosure describes specific compounds useful in deposition of high purity tin oxide as well as compositions that result in better stability during storage of compounds useful in deposition of high purity tin oxide. Also, the present disclosure describes a process for dry etching tin oxide with a particular etchant gas and/or a process for dry etching a substrate using a particular etchant gas with a specific additive.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

The semiconductor industry is increasingly utilizing tin oxide conformal films during processing of electronic devices. Such films can be made using chemical vapor deposition (CVD) or atomic layer deposition (ALD).

To obtain the desired films, the reactant compounds used during the deposition process should be thermally stable whilst exhibiting good reactivity. Such properties allow delivery of the compounds to the deposition chamber without decomposition occurring. Decomposition results in a deposited film which will not be uniform or cause other defects in the deposited film. A good stability and reactivity profile, as demonstrated by the compounds of the invention, also means that less material is required to be delivered to the growth chamber (less material is more economic), and cycling will be faster (as there will be less material left in the chamber at the end of the process to be pumped off), meaning that thicker films can be deposited in shorter times, so increasing throughput. Thermal stability also means that material can be purified much more easily after synthesis, and handling becomes easier.

Although there have been some attempts to find compounds that have the desired thermal stability and good reactivity, there remains a need for compounds having improved thermal stability and/or reactivity which can meet the increased requirements of the industry.

There is also a desire to ensure stability of reactant compounds during storage. Many reactant compounds used to form tin oxide films are known to disproportionate or polymerize. This can cause problems when the reactant compound is stored for periods of time prior to use in a deposition process. Accordingly, there is a need to reduce the effects of disproportionation and increase storage stability of reactant gases used in deposition processes for forming tin oxide films.

In an atomic layer deposition (ALD) system, reactant gases are introduced sequentially to give self-limiting growth of conformal thin films of the desired materials. In both cases, the reactor is a chamber made of a material that does not react with the chemicals being used. It must also withstand high temperatures. This chamber comprises reactor walls, a liner, a pedestal, gas injection units, and temperature control units. Usually, the reactor walls are made from aluminum, stainless steel, or quartz. Ceramics such as $Al_2O_3$, $Y_2O_3$, or other novel ceramics, or special glasses, such as quartz, are often used as the liner in the reactor chamber between the reactor wall and the pedestal. To prevent overheating, coolant, such as water, can flow through channels within the reactor walls. A substrate sits on a pedestal which is held at a controlled temperature. The pedestal is made from a material resistant to the metalorganic compounds used; graphite is sometimes used.

When thin film deposition is carried out, not only is the film deposited on the desired surface but also on all the interior surfaces of the MOCVD or ALD reactor including the pedestal, the walls and the ceiling. The more frequently the reactor is used without being cleaned, the thicker the deposits become. The deposits will eventually start to delaminate, generating particles that can fall onto the substrate wafers, contaminating them and resulting in lower yield. The reactant gases flowing through the reactor chamber may also be contaminated by the deposits. In order to avoid this, reactors must be cleaned out on a regular basis. Depending on the configurations and materials used in the reactor, effective cleaning may require complete reactor strip down and wet clean, which is time consuming and reduces reactor efficiency. In addition, a reactor is typically comprised of a wide range of materials such as 316 L and 304 stainless steel, silicon carbide, graphite, tungsten, aluminum, pyrolytic boron nitride, other ceramics, and/or ethylene propylene diene (EPDN) polymer. It can be difficult to clean deposits off all of these types of surfaces, without using different types of etchants or other cleaners. A simpler, more effective means of cleaning inside a reactor is therefore desired.

In addition, many thin film fabrication methods include an etching step after the deposition. At least some of the deposits on the walls of the chamber are the same materials that are to be etched from the thin film.

ALD reactors for creation of single wafers comprising tin oxide ($SnO_2$) present specific problems for etching and cleaning of the reaction chamber. For example, such reactors may use highly corrosive Cl or Br based chemistries that cause chamber material degradation, require high temperatures inducing materials stress, attack the underlying materials of the ALD chamber, and/or require chamber shielding or inserts to protect chamber walls. In the case of cleaning ALD reactors for tin oxide, using $H_2$, $CH_4$, or other reducing chemistries require longer etch time and have byproducts that condense on the surfaces of the reactor before being evacuated. The use of $CH_4$ can also result in solid tin oxides containing Me-Sn—O, which is known to be more toxic than Sn—O residues. The by-products in the case of tin oxide are prone to low temperature decomposition and thus temperature control below −10 to −30° C. is required which complicates tool configurations. Also, reducing atmosphere can result in reduction of the metal oxides into metals which can then act as passivation layers.

US20040014327A1 "Method for etching high dielectric constant materials and for cleaning deposition chambers for high dielectric constant materials" teaches that another etchant $COCl_2$ can be used to etch metal oxides. However, $COCl_2$ is a highly toxic nerve agent. The use of malonyl chloride as an etchant should similarity be possible, however, malonyl chloride is highly unstable and degrades at room temperature as a liquid, and thus would be difficult to obtain in high enough purity and difficult to transport and store for longer periods. Accordingly, there is a need for an etchant that solves the above problems.

SUMMARY

The present disclosure provides compounds useful for the deposition of high purity tin oxide.

Organometallic compounds include those of Formula I, below:

$$Q_x\text{-Sn-}(A^1R^{1'}{}_z)_{4-x} \qquad \text{Formula I}$$

wherein:

Q is $OR^1$ or Cp;

each $R^1$ group is independently selected from the group consisting of an alkyl or aryl group having from 1 to 10 carbon atoms;

each $R^{1'}$ group is independently selected from the group consisting of an alkyl, acyl or aryl group having from 1 to 10 carbon atoms;

x is an integer from 0 to 3;

A is O when x is 0 and A is N when x is an integer from 1 to 3; and z is 1 when A is O and z is 2 when A is N.

Also disclosed is the deposition of tin oxide using such compounds. The use of compounds of Formula I in the methods disclosed herein allows for chemical vapour deposition (CVD) and atomic layer deposition (ALD) of tin oxide.

In embodiments, Q is Cp, which is a cyclopentadienyl ligand. In some embodiments, x is 1 and compounds of Formula I are represented by the following formula: Cp-Sn—$(NR^{1'}{}_2)_3$, wherein each $R^{1'}$ group is independently selected from the group consisting of an alkyl, acyl or aryl group having from 1 to 10 carbon atoms.

In embodiments, x is an integer from 1 to 3. In such embodiments, compounds of Formula I are represented by the following formula: $(OR^1)_x$—Sn—$(NR^{1'}{}_2)_{4-x}$, wherein each $R^{1'}$ group is independently selected from the group consisting of an alkyl, acyl or aryl group having from 1 to 10 carbon atoms and x is an integer from 1 to 3.

In other embodiments, each $R^1$ group and each $R^{1'}$ group is an independently selected alkyl group having from 1 to 10 carbon atoms. It is contemplated that each $R^1$ group and each $R^{1'}$ group may be an independently selected alkyl group having from 1 to 6 carbon atoms. In embodiments, each $R^1$ group and each $R^{1'}$ group is an independently selected alkyl group having from 1 to 4 carbon atoms. In embodiments, each $R^1$ group and each $R^{1'}$ group is independently selected from the group consisting of methyl, ethyl, propyl, iso-propyl, tert-butyl, iso-butyl and n-butyl. In embodiments, each $R^1$ group and each $R^{1'}$ group represent different alkyl, acyl, or aryl groups, in particular different alkyl groups.

In embodiments, x is 4. In such embodiments, Compounds of Formula I are represented by the following formula: $Sn(OR^1)_4$, wherein each $R^1$ group is independently selected from the group consisting of an alkyl, acyl, or aryl group having from 1 to 10 carbon atoms.

In other embodiments, each $R^{1'}$ group is an independently selected alkyl group having from 1 to 10 carbon atoms. It is contemplated that each $R^{1'}$ group may be an independently selected alkyl group having from 1 to 6 carbon atoms. In embodiments, each $R^{1'}$ group is an independently selected alkyl group having from 1 to 4 carbon atoms. In embodiments, each $R^{1'}$ group is independently selected from the group consisting of methyl, ethyl, propyl, iso-propyl, tert-butyl, iso-butyl and n-butyl. In embodiments, each $R^{1'}$ group represent different alkyl, acyl, or aryl groups, in particular different alkyl groups.

In embodiments, the organometallic compound is selected from the group consisting of $(MeO)_2Sn(NMe_2)_2$, $(MeO)_2Sn(NEtMe)_2$, $(MeO)_3Sn(NMe_2)$, $(MeO)_3Sn(NEtMe)$, $Sn(OMe)_4$, $CpSn(NMe_2)_3$, and $CpSn(NMeEt)_3$.

Other organometallic compounds include those of formula II, below:

$$Sn(NR^2(CH_2)_nA^2)_2 \qquad \text{Formula II}$$

wherein:

each $A^2$ is independently selected from $NR^{2'}$ or O;

each $R^2$ group is independently selected from the group consisting of hydrogen and an alkyl or aryl group having from 1 to 10 carbon atoms;

each $R^{2'}$ group is independently selected from the group consisting of hydrogen and an alkyl, acyl or aryl group having from 1 to 10 carbon atoms;

n is 2 or 3;

optionally $NR^2$ $(CH_2)_nNR^{2'}$ forms a cyclic structure; and optionally at least one of the $(CH_2)$ has one or more substitutions with an alkyl group having from 1 to 10 carbon atoms.

Also disclosed is the deposition of tin oxide using such compounds. The use of compounds of Formula II in the methods disclosed herein allows for chemical vapour deposition (CVD) and atomic layer deposition (ALD) of tin oxide.

In embodiments, $A^2$ is O and Formula II is represented by Formula IIa: $Sn(NR^2(CH_2)_nO)_2$, wherein each $R^2$ group is independently selected from an alkyl or aryl group having from 1 to 10 carbon atoms, or selected from alkyl groups having from 1 to 10 carbon atoms, 1 to 6 carbon atoms, or 1 to 4 carbon atoms. In embodiments, each $R^2$ group is independently selected from the group consisting of methyl, ethyl, propyl, iso-propyl, tert-butyl, iso-butyl and n-butyl.

In embodiments, each $R^2$ group is independently selected from an alkyl group having from 1 to 10 carbon atoms. It is contemplated that each $R^2$ group may be an independently selected alkyl group having from 1 to 6 carbon atoms. In embodiments, each $R^2$ group is an independently selected alkyl group having from 1 to 4 carbon atoms. In embodiments, each $R^2$ group is independently selected from the group consisting of methyl, ethyl, propyl, iso-propyl, tert-butyl, iso-butyl and n-butyl. In embodiments, each $R^2$ group represents different alkyl, acyl, or aryl groups, in particular different alkyl groups.

In embodiments, each $R^{2'}$ group is independently selected from hydrogen or an alkyl group having from 1 to 10 carbon atoms. It is contemplated that each $R^{2'}$ group may be independently selected from hydrogen or an alkyl group having from 1 to 6 carbon atoms. In embodiments, each $R^{2'}$ group is independently selected from hydrogen or alkyl group having from 1 to 4 carbon atoms. In embodiments, each $R^{2'}$ group is independently selected from the group consisting of methyl, ethyl, propyl, iso-propyl, tert-butyl, iso-butyl and n-butyl. In embodiments each $R^{2'}$ group represents hydrogen or different alkyl, acyl, or aryl groups, in particular different alkyl groups.

In embodiments, n is 2. In other embodiments, n is 3.

In embodiments, at least one of the $(CH_2)$ has one or more substitutions with an alkyl group having from 1 to 10 carbon atoms, or 1 to 6 carbon atoms, or 1 to 4 carbon atoms. Alternatively, the one or more substitutions are with methyl or ethyl. In particular embodiments, only one of the $(CH_2)$ has one or more substitutions with an alkyl group, such as methyl or ethyl. In more particular embodiments, one of the $(CH_2)$ is substituted with two methyl groups.

In embodiments, Formula II is represented by

Formula IIb

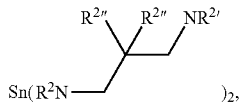

wherein:

each $R^2$ group is independently selected from the group consisting of hydrogen and an alkyl or aryl group having from 1 to 10 carbon atoms;

each $R^{2'}$ group is independently selected from the group consisting of hydrogen and an alkyl, acyl or aryl group having from 1 to 10 carbon atoms; and each $R^{2''}$ group and each $R^{2'''}$ group is an independently selected alkyl group having 1 to 10 carbon atoms.

In embodiments, each $R^2$, $R^{2'}$, $R^{2''}$, or $R^{2'''}$ group of Formula IIb is independently selected from hydrogen or alkyl group having from 1 to 10 carbon atoms, 1 to 6 carbon atoms, or 1 to 4 carbon atoms. In particular embodiments of Formula IIb, each $R^2$ and $R^{2'}$ is hydrogen and each $R^{2''}$ and $R^{2'''}$ group is an independently selected alkyl group having from 1 to 10 carbon atoms, 1 to 6 carbon atoms, or 1 to 4 carbon atoms. In more particular embodiments of Formula IIb, each $R^2$ and $R^{2'}$ is hydrogen and each $R^{2''}$ and $R^{2'''}$ group is independently selected from ethyl or methyl.

In some embodiments where $A^2$ is $NR^{2'}$, $NR(CH_2)_nNR^{2'}$ forms a cyclic structure. In particular embodiments of the cyclic structure, $R^2$ and $R^{2'}$ groups are alkyl groups selected from methyl or ethyl. In embodiments, Formula II is represented by Formula IIc:

Formula IIc

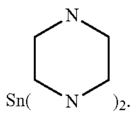

In embodiments, each $(NR^2(CH_2)_nA^2)$ is selected from the group consisting of N,N'-dimethylethylenediamine $(NMe(CH_2)_2NMe)$, piperazine $(N_2C_4H_8)$, N,N'-diethylethylenediamine $(NEt(CH_2)_2NEt)$, N,N'-diisopropylethylenediamine $(NiPr(CH_2)_2NiPr)$, N,N'-di-tert-butylethylenediamine $(NtBu(CH_2)_2NtBu)$, N,N'-dimethyl-1,3-propanediamine $(NMe(CH_2)_3NMe)$, 2,2-dimethyl-1,3-propanediamine $(NH(CH_2)(C(CH_3))(CH_2)NH)$, 2-(methylamino)ethanol $(NMe(CH_2)_2O)$, and 2-(ethylamino)ethanol $(NEt(CH_2)_2O)$.

The present disclosure provides compositions combining a second organometallic compound with a first organometallic compound to reduce disproportionation of the first organometallic compound so as to increase storage stability.

Compositions include:

a first organometallic compound represented by Formula III:

$$R^3_2Sn(NR^{3'}_2)_2 \qquad \text{Formula III}$$

wherein:

each $R^3$ group is independently selected from the group consisting of an alkyl or aryl group having from 1 to 10 carbon atoms;

each $R^{3'}$ group is independently selected from the group consisting of an alkyl or aryl group having from 1 to 10 carbon atoms; and a second organometallic compound represented by Formula IV:

$$Sn(NR^4_2)_4 \qquad \text{Formula IV}$$

wherein each $R^4$ group is independently selected from the group consisting of an alkyl or aryl group having from 1 to 10 carbon atoms.

In other embodiments, each $R^3$, $R^{3'}$, and $R^4$ group is an independently selected alkyl group having from 1 to 10 carbon atoms. It is contemplated that each $R^3$, $R^{3'}$, and $R^4$ group may be an independently selected alkyl group having from 1 to 6 carbon atoms. In embodiments, each $R^3$, $R^{3'}$, and $R^4$ group is an independently selected alkyl group having from 1 to 4 carbon atoms. In embodiments, each $R^3$, $R^{3'}$, and $R^4$ group is independently selected from the group consisting of methyl, ethyl, propyl, iso-propyl, tert-butyl, iso-butyl and n-butyl. In embodiments, each $R^3$, $R^{3'}$, and $R^4$ group represent different alkyl, acyl, or aryl groups, in particular different alkyl groups.

In embodiments, the second organometallic compound is selected from the group consisting of $Sn(NMe_2)_4$, $Sn(NEt_2)_4$, and $Sn(NMeEt)_4$.

The present disclosure provides a new etching process that solves the problems discussed above with previous methods of etching and cleaning ALD reactors, and in particular, ALD reactors in tin oxide fabrication.

One process that solves the problems discussed above includes: a process for removing tin oxide deposits from interior surfaces of a reactor chamber or from a substrate within said reactor chamber, including:

introducing an etchant gas into said reactor chamber, said etchant gas being of the general formula $A^3O_mX_n$, wherein: $A^3$ is selected from the group consisting of C, N, and S; O is oxygen; each X is independently selected from a group consisting of halogens; and the subscripts $_m$ and $_n$ are greater than zero;

activating said etchant gas either before or after said introduction;

allowing an etching reaction to proceed between said activated etchant gas and said tin oxide deposits; and evacuating the etchant gas together with gaseous products of the etching reaction.

Another process that solves the problems discussed above includes: a process for removing deposits from interior surfaces of a reactor chamber or from a substrate within said reactor chamber, including:

introducing an etchant gas and additive into said reactor chamber, said etchant gas being of the general formula $A^3O_mX_n$, wherein: $A^3$ is selected from the group consisting of C, N, and S; O is oxygen; each X is independently selected from a group consisting of halogens; the subscripts $_m$ and $_n$ are greater than zero;

and said additive being of the general formula $C_xH_yO_z$, wherein the subscripts x and z are greater than zero;

activating said etchant gas either before or after said introduction;

allowing an etching reaction to proceed between said activated etchant gas and said deposits; and evacuating the etchant gas together with gaseous products of the etching reaction.

In an embodiment according to any of the above processes, X represents a combination of two different halogens.

In an embodiment according to any of the above processes, generating said etchant gas occurs prior to said introduction into said chamber.

In an embodiment according to any of the above processes, bubbling a carrier gas through a liquid chemical constituent to volatilize said liquid chemical constituent into said etchant, occurs prior to said introduction of said etchant gas into said chamber.

In an embodiment according to any of the above processes, said etchant gas is generated by bubbling a carrier gas through a plurality of liquid chemical constituents and then combining the resulting gases.

In an embodiment according to any of the above processes, said etchant gas is generated by mixing two or more chemical constituent gases.

In an embodiment according to any of the above processes, said etchant gas is activated by exposing it to an activation mechanism in a gas activation chamber prior to introduction into said chamber; said gas activation mechanism being selected from the group consisting of heat, ultraviolet light and plasma discharge.

In an embodiment according to any of the above processes, said etchant gas is activated by exposing it to a thermal activation mechanism after introduction into said chamber; said thermal activation mechanism being selected from the group consisting of: the overall temperature within said chamber and a local heat source within said chamber.

In an embodiment according to any of the above processes, said etchant gas is selected from the group consisting of $COCl_2$, $COBr_2$, $COI_2$, $SOI_2$, $SOCl_2$, $SOBr_2$, $SO_2Cl_2$, $SO_2Br_2$, NOCl, NOBr, NOI, SOClBr, SOClF, and SOFBr. In particular embodiments, thionyl chloride ($SOCl_2$) is used.

In an embodiment according to any of the above processes, said additive is CO or $CO_2$.

In an embodiment according to any of the above processes, a halogen containing additive is added to a gaseous mixture with said etchant gas.

In an embodiment according to any of the above processes, the halogen containing additive is an active halogen or a compound of the general formula $R^5X^1$, wherein $R^5$ is selected from the group consisting of H and Me; and $X^1$ is a halogen selected from the group consisting of F, Cl, Br, and I.

In an embodiment according to any of the above processes, the active halogen includes Cl or Br.

In an embodiment according to any of the above processes, a dilution additive is added to a gaseous mixture with said etchant gas.

In an embodiment according to any of the above processes, the dilution additive includes N, Ar, He, or Ne.

In an embodiment according to any of the above processes, said reactor chamber is heated to a temperature of at least 100° C., between 100° C. and 900° C., or between 100° C. and 400° C.

In an embodiment according to any of the above processes, said reactor chamber is provided with a pressure of between 0.1 mBar and 1500 mBar, preferably between 0.1 mBar and 1000 mBar.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

Embodiments of the invention will now be described by way of example with reference to the accompanying drawings, of which.

DETAILED DESCRIPTION OF PARTICULAR EMBODIMENTS

Figure 1:
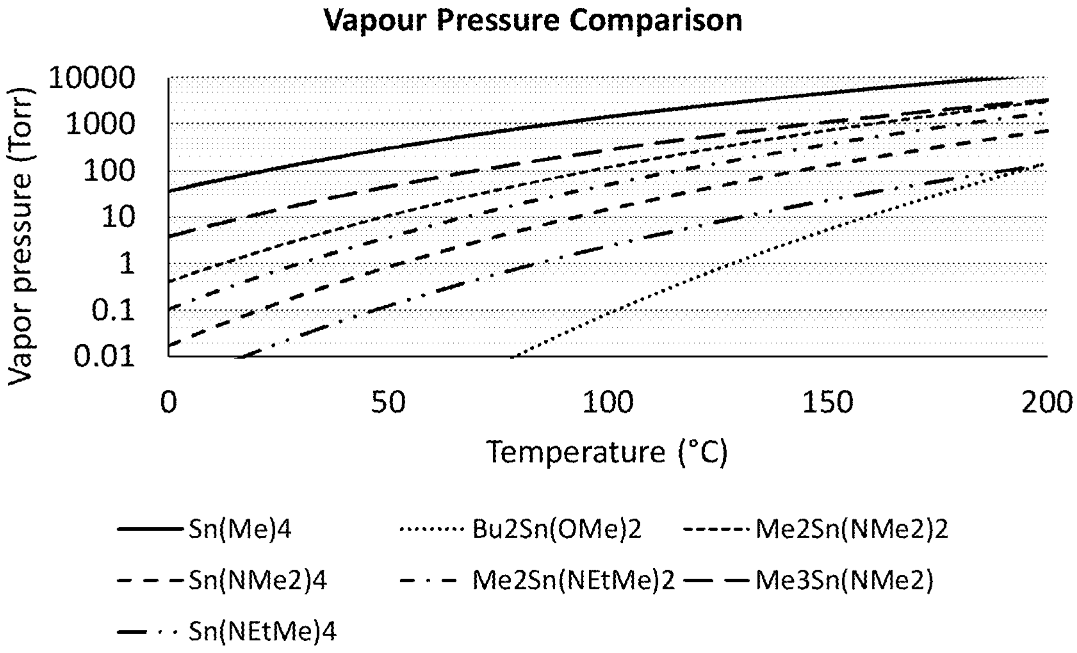
FIG. 1 is a comparison graph of vapor pressures for a number of compounds useable in forming tin oxide films.

The following detailed description can be read in connection with the accompanying drawings in which like numerals designate like elements.

Disclosed are organometallic compounds of Formula I, below:

$$Q_x\text{-}Sn\text{-}(A^1R^{1'}{}_z)_{4-x} \qquad \text{Formula I}$$

wherein:

Q is $OR^1$ or Cp;

each $R^1$ group is independently selected from the group consisting of an alkyl or aryl group having from 1 to 10 carbon atoms;

each $R^{1'}$ group is independently selected from the group consisting of an alkyl, acyl or aryl group having from 1 to 10 carbon atoms;

x is an integer from 1 to 4;

$A^1$ is O when x is 0 and $A^1$ is N when x is an integer from 1 to 3; and z is 1 when $A^1$ is O and z is 2 when $A^1$ is N.

In embodiments, Q is Cp, which is a cyclopentadienyl ligand. In some embodiments, x is 1 and compounds of Formula I are represented by the following formula: Cp-Sn—$(NR^{1'}_2)_3$, wherein each $R^{1'}$ group is independently selected from the group consisting of an alkyl, acyl or aryl group having from 1 to 10 carbon atoms.

Compounds of Formula I include those in which x is an integer from 1 to 3. In such embodiments, compounds of Formula I are represented by the following formula: $(OR^1)_x$—Sn—$(NR^{1'}_2)_{4-x}$, wherein each $R^{1'}$ group is independently selected from the group consisting of an alkyl, acyl or aryl group having from 1 to 10 carbon atoms and x is an integer from 1 to 3.

Compounds of Formula I represented by the formula: $(OR^1)_x$—Sn—$(NR^{1'}_2)_{4-x}$ include those in which each $R^1$ group and each $R^{1'}$ group is an independently selected alkyl group having from 1 to 10 carbon atoms. It is contemplated that each $R^1$ group and each $R^{1'}$ group may be an independently selected alkyl group having from 1 to 6 carbon atoms. Particularly, each $R^1$ group and each $R^{1'}$ group is an independently selected alkyl group having from 1 to 4 carbon atoms. More particularly, each $R^1$ group and each $R^{1'}$ group is independently selected from the group consisting of methyl, ethyl, propyl, iso-propyl, tert-butyl, iso-butyl and n-butyl. Also, for some compounds, each $R^1$ group and each $R^{1'}$ group may represent different alkyl, acyl, or aryl groups, in particular different alkyl groups.

Compounds of Formula I include those in which x is 4. In such embodiments, Compounds of Formula I are represented by the following formula: $Sn(OR^1)_4$, wherein each $R^1$ group is independently selected from the group consisting of an alkyl, acyl, or aryl group having from 1 to 10 carbon atoms.

Compounds of Formula I represented by the formula: $Sn(OR^1)_4$ include those in which each $R^1$ group is an independently selected alkyl group having from 1 to 10 carbon atoms. It is contemplated that each $R^1$ group may be an independently selected alkyl group having from 1 to 6 carbon atoms. Particularly, each $R^1$ group is an independently selected alkyl group having from 1 to 4 carbon atoms. More particularly, each $R^1$ group is independently selected from the group consisting of methyl, ethyl, propyl, iso-propyl, tert-butyl, iso-butyl and n-butyl. Also, for some compounds, each $R^1$ group represent different alkyl, acyl, or aryl groups, in particular different alkyl groups.

Particular organometallic compounds of Formula I include the following: $(MeO)_2Sn(NMe_2)_2$, $(MeO)_2Sn(NEtMe)_2$, $(MeO)_3Sn(NMe_2)$, $(MeO)_3Sn(NEtMe)$, $Sn(OMe)_4$ $CpSn(NMe_2)_3$, or $CpSn(NMeEt)_3$.

Other organometallic compounds include those of Formula II, below:

$$Sn(NR^2(CH_2)_nA^2)_2 \qquad \text{Formula II}$$

wherein:

each $A^2$ is independently selected from $NR^{2'}$ or O;

each $R^2$ group is independently selected from the group consisting of hydrogen and an alkyl or aryl group having from 1 to 10 carbon atoms;

each $R^{2'}$ group is independently selected from the group consisting of hydrogen and an alkyl, acyl or aryl group having from 1 to 10 carbon atoms;

n is 2 or 3;

optionally $NR^2$ $(CH_2)_nNR^{2'}$ forms a cyclic structure; and optionally at least one of the $(CH_2)$ has one or more substitutions with an alkyl group having from 1 to 10 carbon atoms.

Also disclosed is the deposition of tin oxide using such compounds. The use of compounds of Formula II in the methods disclosed herein allows for chemical vapour deposition (CVD) and atomic layer deposition (ALD) of tin oxide.

In embodiments, $A^2$ is O and Formula II is represented by Formula IIa: $Sn(NR^2(CH_2)_nO)_2$, wherein each $R^2$ group is independently selected from an alkyl or aryl group having from 1 to 10 carbon atoms, or selected from alkyl groups having from 1 to 10 carbon atoms, 1 to 6 carbon atoms, or 1 to 4 carbon atoms. In embodiments, each $R^2$ group is independently selected from the group consisting of methyl, ethyl, propyl, iso-propyl, tert-butyl, iso-butyl and n-butyl.

In embodiments, each $R^2$ group is independently selected from an alkyl group having from 1 to 10 carbon atoms. It is contemplated that each $R^2$ group may be an independently selected alkyl group having from 1 to 6 carbon atoms. In embodiments, each $R^2$ group is an independently selected alkyl group having from 1 to 4 carbon atoms. In embodiments, each $R^2$ group is independently selected from the group consisting of methyl, ethyl, propyl, iso-propyl, tert-butyl, iso-butyl and n-butyl. In embodiments, each $R^2$ group represents different alkyl, acyl, or aryl groups, in particular different alkyl groups.

In embodiments, each $R^{2'}$ group is independently selected from hydrogen or an alkyl group having from 1 to 10 carbon atoms. It is contemplated that each $R^{2'}$ group may be independently selected from hydrogen or an alkyl group having from 1 to 6 carbon atoms. In embodiments, each $R^{2'}$ group is independently selected from hydrogen or alkyl group having from 1 to 4 carbon atoms. In embodiments, each $R^{2'}$ group is independently selected from the group consisting of methyl, ethyl, propyl, iso-propyl, tert-butyl, iso-butyl and n-butyl. In embodiments each $R^{2'}$ group represents hydrogen or different alkyl, acyl, or aryl groups, in particular different alkyl groups.

In embodiments, n is 2. In other embodiments, n is 3.

In embodiments, at least one of the $(CH_2)$ has one or more substitutions with an alkyl group having from 1 to 10 carbon atoms, or 1 to 6 carbon atoms, or 1 to 4 carbon atoms. Alternatively, the one or more substitutions are with methyl or ethyl. In particular embodiments, only one of the $(CH_2)$ has one or more substitutions with an alkyl group, such as methyl or ethyl. In more particular embodiments, one of the $(CH_2)$ is substituted with two methyl groups.

In embodiments, Formula II is represented by

Formula IIb

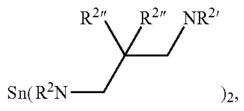

wherein:

each $R^2$ group is independently selected from the group consisting of hydrogen and an alkyl or aryl group having from 1 to 10 carbon atoms;

each $R^{2'}$ group is independently selected from the group consisting of hydrogen and an alkyl, acyl or aryl group having from 1 to 10 carbon atoms; and each $R^{2''}$ group and each $R^{2'''}$ group is an independently selected alkyl group having 1 to 10 carbon atoms.

In embodiments, each $R^2$, $R^{2'}$, $R^{2''}$, or $R^{2'''}$ group of Formula IIb is independently selected from hydrogen or alkyl group having from 1 to 10 carbon atoms, 1 to 6 carbon atoms, or 1 to 4 carbon atoms. In particular embodiments of Formula IIb, each $R^2$ and $R^{2'}$ is hydrogen and each $R^{2''}$ and $R^{2'''}$ group is an independently selected alkyl group having from 1 to 10 carbon atoms, 1 to 6 carbon atoms, or 1 to 4 carbon atoms. In more particular embodiments of Formula IIb, each $R^2$ and $R^{2'}$ is hydrogen and each $R^{2''}$ and $R^{2'''}$ group is independently selected from ethyl or methyl.

In some embodiments where $A^2$ is N, $NR(CH_2)_nNR'$ forms a cyclic structure. In particular embodiments of the cyclic structure, R and R' groups are alkyl groups selected from methyl or ethyl. In embodiments, Formula II is represented by Formula IIc:

Formula IIc

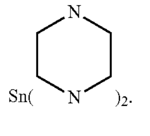

In embodiments, each $(NR^2(CH_2)_nA^2)$ is selected from the group consisting of N,N'-dimethylethylenediamine $(NMe(CH_2)_2NMe)$, piperazine $(N_2C_4H_8)$, N,N'-diethylethylenediamine $(NEt(CH_2)_2NEt)$, N,N'-diisopropylethylenediamine $(NiPr(CH_2)_2NiPr)$, N,N'-di-tert-butylethylenediamine $(NtBu(CH_2)_2NtBu)$, N,N'-dimethyl-1,3-propanediamine $(NMe(CH_2)_3NMe)$, 2,2-dimethyl-1,3-propanediamine $(NH(CH_2)(C(CH_3))(CH_2)NH)$, 2-(methylamino)ethanol $(NMe(CH_2)_2O)$, and 2-(ethylamino)ethanol $(NEt(CH_2)_2O)$.

Compounds of Formula I and II are thermally stable whilst exhibiting good reactivity, whereby delivery of the compound to the deposition chamber should take place without decomposition occurring. (decomposition results in a deposited film which will not be uniform or creates defects in the deposited film). A good stability and reactivity profile, as demonstrated by the compounds of the invention, is also expected to require less material be delivered to the growth chamber (less material is more economic), and expected to have faster cycling time (as there will be less material left in the chamber at the end of the process to be pumped off), meaning that thicker films can be deposited in shorter times, so increasing throughput. Further, ALD is expected to be able to be carried out at much lower temperatures (or using a wider temperature window) using compounds of Formula I or II. Thermal stability also means that material can be purified much more easily after synthesis, and handling becomes easier.

The compounds of Formula I and II have the additional advantage over previous compounds that there is no C—Sn bonding. C—Sn bonding leads to the formation of Me-Sn—O solid residues which are known to be more toxic than residues formed from the compounds of Formula I and II. Also, compounds of Formula I and II have lower molecular weight than previous compounds, but are still expected to have higher thermal stability than those previous compounds.

Compounds of Formula I or II may be prepared by processes known in the art. The examples below are illustrative of such processes, but are not intended to be limiting.

Example 1: Synthesis of $Sn(NMeEt)_4$

Figure 6:
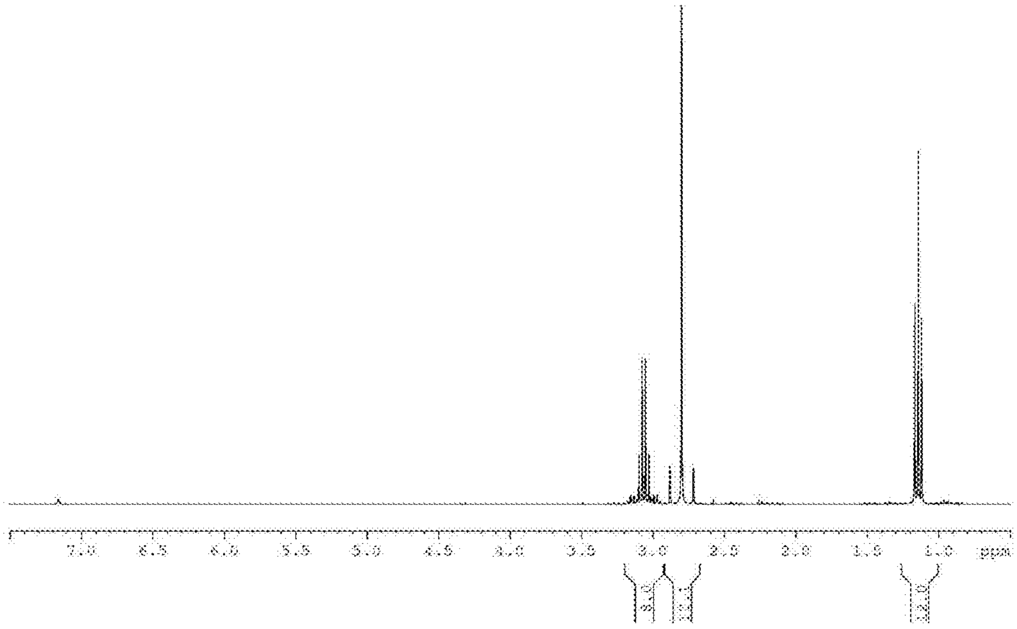
FIG. 6 shows the $^1H$ NMR spectrum of $Sn(NMeEt)_4$.

Under inert atmosphere, a 1-L round bottom flask was loaded with 67 mL of 2.5 M nBuLi solution in hexanes and ca. 500 mL of anhydrous hexanes. Contents of the flask were cooled in an ice/water bath, and 16 mL of HNMeEt were then added dropwise to the reaction flask while stirring vigorously. The reaction mixture was stirred at room temperature for 1 h, then cooled again in an ice/water bath. 4.90 mL of $SnCl_4$ were added dropwise to the reaction flask via syringe. The reaction flask was covered with aluminum foil, and its contents were left stirring at room temperature overnight. The next day, LiCl salts were separated from the reaction mixture via filtration. 8.42 g (57% yield) of $Sn(NMeEt)_4$ were isolated via distillation at 70° C. at 0.05 Torr. As shown in FIG. 6, the product was confirmed to be $Sn(NMeEt)_4$ by $^1H$ NMR spectroscopy.

Example 2: Synthesis of $Sn(OtBu)_4$

Figure 7:
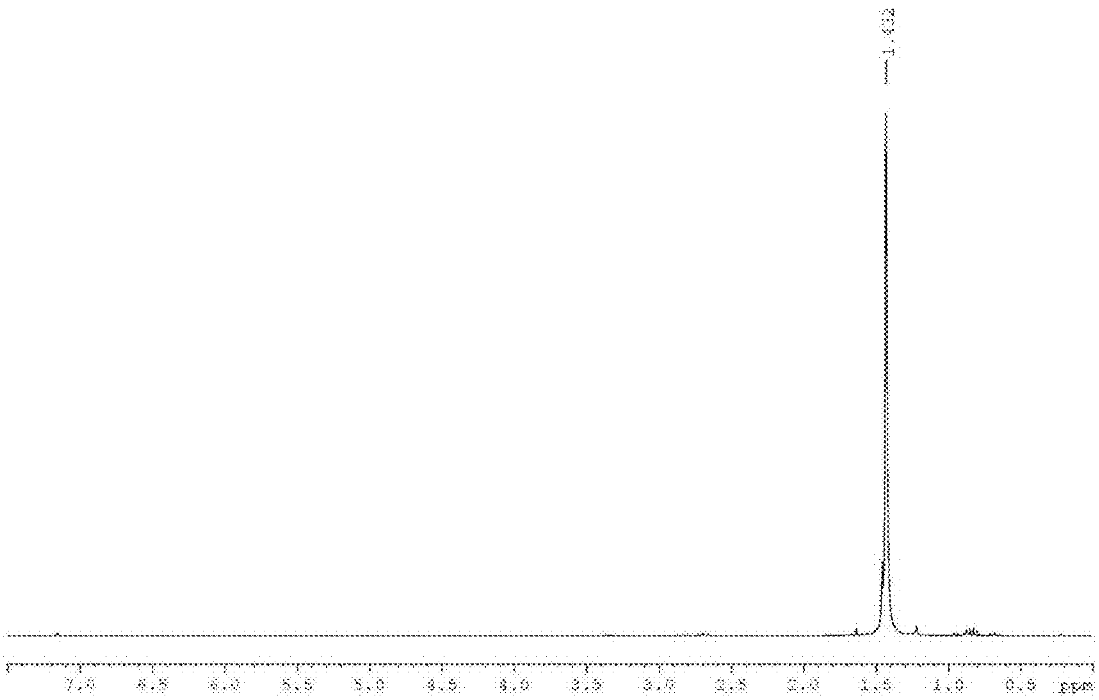
FIG. 7 shows the $^1H$ NMR spectrum of $Sn(OtBu)_4$.

Under inert atmosphere, a 1-L round bottom flask was charged with 10 g of $SnCl_4$ and ca. 400 mL of anhydrous hexane. Contents of the flask were cooled in an ice/water bath, followed by a slow addition of 16.6 mL of $HNEt_2$ in 100 mL of anhydrous hexane into the reaction flask. The reaction mixture was then stirred at room temperature for 2 h, then cooled again in an ice/water bath. The solution of 15.4 mL of tBuOH in ca. 50 mL of anhydrous hexanes was then added to the flask, and the reaction mixture was left stirring at room temperature overnight. The next day, $H_2NEt_2^+Cl^-$ salts were separated from the reaction mixture via filtration. The solvent was removed from the filtrate via reduced pressure distillation. As shown in FIG. 7, the remaining yellow residue (8 g, 38% yield) was confirmed to be to $Sn(OtBu)_4$ by $^1H$ NMR spectroscopy.

Example 3: Synthesis of $Sn(OiPr)_4$

Under inert atmosphere, a 1-L reactor was charged with 49 g of iPrOH and ca 400 mL of anhydrous benzene. Contents of the reactor were cooled to 0° C., and 50 g of $SnCl_4$ were slowly added to the reactor via syringe. $HNMe_2$ gas was then passed through the reaction mixture for 4 h while stirring vigorously. The reaction mixture was refluxing for 1 h during the addition of $HNMe_2$. The reaction mixture was left stirring at room temperature overnight. The next day, $H_2NMe_2^+Cl^-$ salts were separated from the reaction mixture via filtration. The solvent was removed from the filtrate via reduced pressure distillation leaving final product behind.

Example 4: Synthesis of $Sn(OEt)_4$

Under inert atmosphere, a 1-L round bottom flask may be charged with 10 g of $SnCl_4$ and ca. 400 mL of anhydrous hexane. Contents of the flask may be cooled in an ice/water bath, followed by a slow addition of 16.6 mL of $HNEt_2$ in 100 mL of anhydrous hexane into the reaction flask. The reaction mixture may then be stirred at room temperature for 2 h, then cooled again in an ice/water bath. The solution of 15.4 mL of EtOH in ca. 50 mL of anhydrous hexanes may then be added to the flask, and the reaction mixture may be left stirring at room temperature overnight. The next day, $H_2NEt_2^+Cl^-$ salts may be separated from the reaction mixture via filtration. The solvent may be removed from the filtrate via reduced pressure distillation.

Example 5: Synthesis of $Sn(OMe)_4$

Under inert atmosphere, a 1-L round bottom flask may be charged with 10 g of $SnCl_4$ and ca. 400 mL of anhydrous hexane. Contents of the flask may be cooled in an ice/water bath bath, followed by a slow addition of 16.6 mL of $HNEt_2$ in 100 mL of anhydrous hexane into the reaction flask. The reaction mixture may then be stirred at room temperature for 2 h, then cooled again in an ice/water bath. The solution of 15.4 mL of MeOH in ca. 50 mL of anhydrous hexanes may then be added to the flask, and the reaction mixture may be left stirring at room temperature overnight. The next day, $H_2NEt_2^+Cl^-$ salts may be separated from the reaction mixture via filtration. The solvent may be removed from the filtrate via reduced pressure distillation.

Example 6: Synthesis of $(MeO)_3Sn(NMeEt)$

Under inert atmosphere, a 1-L reactor was loaded with 25 mL of 2.5 M nBuLi solution in hexanes and ca. 500 mL of anhydrous hexanes. Contents of the reactor were cooled to 0° C., and 3.8 g of HNMeEt in ca. 100 mL anhydrous hexanes were added to the solution while stirring vigorously. Afterwards, the reaction mixture was stirred for 1 h at room temperature, then cooled again to 0° C. 15.3 g of $Sn(OMe)_4$ in ca. 200 mL of anhydrous benzene were added dropwise to the reaction mixture. The contents of the reaction flask were warmed up to room temperature and left stirring overnight. The next day LiOMe salts were separated from the reaction mixture via filtration. The solvents were removed from the filtrate via reduced pressure distillation. The product was purified via distillation under reduced pressure.

Example 7: Synthesis of $(EtO)_2Sn(NMe_2)_2$

Under inert atmosphere, a 1-L reactor was loaded with 50 mL of 2.5 M nBuLi solution in hexanes and ca. 500 mL of anhydrous hexanes. Contents of the reactor were cooled to 0° C., and $HNMe_2$ gas was passed through the solution for 30 min while stirring vigorously. Afterwards, the reaction mixture was stirred for 1 h at room temperature, then cooled again to 0° C. 18.8 g of $Sn(OEt)_4$ in ca. 200 mL of anhydrous benzene were added dropwise to the reaction mixture. The contents of the reaction flask were warmed up to room temperature and left stirring overnight. The next day LiOEt salts were separated from the reaction mixture via filtration. The solvents were removed from the filtrate via reduced pressure distillation. The product was purified via distillation under reduced pressure.

Example 8: Synthesis of $(EtO)_3Sn(NMe_2)$

Under inert atmosphere, a 1-L reactor was loaded with 25 mL of 2.5 M nBuLi solution in hexanes and ca. 500 mL of anhydrous hexanes. Contents of the reactor were cooled to 0° C., and $HNMe_2$ gas was passed through the solution for 30 min while stirring vigorously. Afterwards, the reaction mixture was stirred for 1 h at room temperature, then cooled again to 0° C. 18.8 g of $Sn(OEt)_4$ in ca. 200 mL of anhydrous benzene were added dropwise to the reaction mixture. The contents of the reaction flask were warmed up to room temperature and left stirring overnight. The next day LiOEt salts were separated from the reaction mixture via filtration. The solvents were removed from the filtrate via reduced pressure distillation. The product was purified via distillation under reduced pressure.

Example 9: Synthesis of $(EtO)_2Sn(NMeEt)_2$

Under inert atmosphere, a 1-L reactor was loaded with 50 mL of 2.5 M nBuLi solution in hexanes and ca. 500 mL of anhydrous hexanes. Contents of the reactor were cooled to 0° C., and 7.5 g of HNMeEt in ca. 100 mL anhydrous hexanes were added to the solution while stirring vigorously. Afterwards, the reaction mixture was stirred for 1 h at room temperature, then cooled again to 0° C. 18.8 g of $Sn(OEt)_4$ in ca. 200 mL of anhydrous benzene were added dropwise to the reaction mixture. The contents of the reaction flask were warmed up to room temperature and left stirring overnight. The next day LiOEt salts were separated from the reaction mixture via filtration. The solvents were removed from the filtrate via reduced pressure distillation. The product was purified via distillation under reduced pressure.

Example 10: Synthesis of $(EtO)_3Sn(NMeEt)$

Under inert atmosphere, a 1-L reactor was loaded with 25 mL of 2.5 M nBuLi solution in hexanes and ca. 500 mL of anhydrous hexanes. Contents of the reactor were cooled to 0° C., and 3.8 g of HNMeEt in ca. 100 mL anhydrous hexanes were added to the solution while stirring vigorously. Afterwards, the reaction mixture was stirred for 1 h at room temperature, then cooled again to 0° C. 18.8 g of $Sn(OEt)_4$ in ca. 200 mL of anhydrous benzene were added dropwise to the reaction mixture. The contents of the reaction flask were warmed up to room temperature and left stirring overnight. The next day LiOEt salts were separated from the reaction mixture via filtration. The solvents were removed from the filtrate via reduced pressure distillation. The product was purified via distillation under reduced pressure.

Example 11: Synthesis of $CpSn(NMe_2)_3$

Dicyclopentadiene dimer was cracked using fractional distillation and prepared Cp-H was used on the same day. In the glovebox, a 1 L round bottom flask was loaded with 50.0 g of $Sn(NMe_2)_4$ and ca. 400 mL of anhydrous hexanes. On a double manifold, 11.0 g of Cp-H were added to the reaction flask, and the reaction mixture was refluxed for 3 hours while stirring. The solvents were removed in vacuo and final material was isolated via reduced pressure distillation.

Example 12: Synthesis of $CpSn(NMeEt)_3$

Dicyclopentadiene dimer was cracked using fractional distillation and prepared Cp-H was used on the same day. In the glovebox, a 1 L round bottom flask was loaded with 50.0 g of $Sn(NMeEt)_4$ and ca. 400 mL of anhydrous hexanes. On a double manifold, 9.3 g of Cp-H were added to the reaction flask, and the reaction mixture was refluxed for 3 hours while stirring. The solvents were removed in vacuo and final material was isolated via reduced pressure distillation.

Example 13: Synthesis of $Sn(NMeCH_2CH_2NMe)_2$

Under inert atmosphere, a 1-L reactor was loaded with 62 mL of 2.5 M nBuLi solution in hexanes and ca. 500 mL of anhydrous hexanes. Contents of the reactor were cooled to 0° C., and 7.11 g of $NHMeCH_2CH_2NHMe$ were added to the solution while stirring vigorously. Afterwards, the reaction mixture was stirred for 1 h at room temperature, then cooled again to 0° C. 10.0 g of $SnCl_4$ in ca. 200 mL of anhydrous hexanes were added dropwise to the reaction mixture. The contents of the reaction flask were warmed up to room temperature and left stirring overnight. The next day LiCl salts were separated from the reaction mixture via filtration.

The solvents were removed from the filtrate via reduced pressure distillation. The product was purified via distillation under reduced pressure.

Example 14: Synthesis of $Sn(N_2C_4H_8)_2$

Under inert atmosphere, a 1-L reactor was loaded with 62 mL of 2.5 M nBuLi solution in hexanes and ca. 500 mL of anhydrous hexanes. Contents of the reactor were cooled to 0° C., and 6.94 g of piperazine were added to the solution while stirring vigorously. Afterwards, the reaction mixture was stirred for 1 h at room temperature, then cooled again to 0° C. 10.0 g of $SnCl_4$ in ca. 200 mL of anhydrous hexanes were added dropwise to the reaction mixture. The contents of the reaction flask were warmed up to room temperature and left stirring overnight. The next day LiCl salts were separated from the reaction mixture via filtration. The solvents were removed from the filtrate via reduced pressure distillation. The product was purified via distillation under reduced pressure.

Example 15: Synthesis of $Sn(MeNCH_2CH_2CH_2NMe)_2$

Under inert atmosphere, a 1-L reactor was loaded with 62 mL of 2.5 M nBuLi solution in hexanes and ca. 500 mL of anhydrous hexanes. Contents of the reactor were cooled to 0° C., and 8.24 g of $NHMeCH_2CH_2CH_2NHMe$ were added to the solution while stirring vigorously. Afterwards, the reaction mixture was stirred for 1 h at room temperature, then cooled again to 0° C. 10.0 g of $SnCl_4$ in ca. 200 mL of anhydrous hexanes were added dropwise to the reaction mixture. The contents of the reaction flask were warmed up to room temperature and left stirring overnight. The next day LiCl salts were separated from the reaction mixture via filtration. The solvents were removed from the filtrate via reduced pressure distillation. The product was purified via distillation under reduced pressure.

Example 16: Synthesis of $Sn(MeNCH_2CH_2O)_2$

Under inert atmosphere, a 1-L reactor was loaded with 62 mL of 2.5 M nBuLi solution in hexanes and ca. 500 mL of anhydrous hexanes. Contents of the reactor were cooled to 0° C., and 6.05 g of $NHMeCH_2CH_2OH$ were added to the solution while stirring vigorously. Afterwards, the reaction mixture was stirred for 1 h at room temperature, then cooled again to 0° C. 10.0 g of $SnCl_4$ in ca. 200 mL of anhydrous hexanes were added dropwise to the reaction mixture. The contents of the reaction flask were warmed up to room temperature and left stirring overnight. The next day LiCl salts were separated from the reaction mixture via filtration. The solvents were removed from the filtrate via reduced pressure distillation. The product was purified via distillation under reduced pressure.

Example 17: Reactivity Test

Water is added to $Sn(NMeEt)_4$. An instantaneous exothermic reaction occurred with formation of white $SnO_2$ solid.

Figure 8:
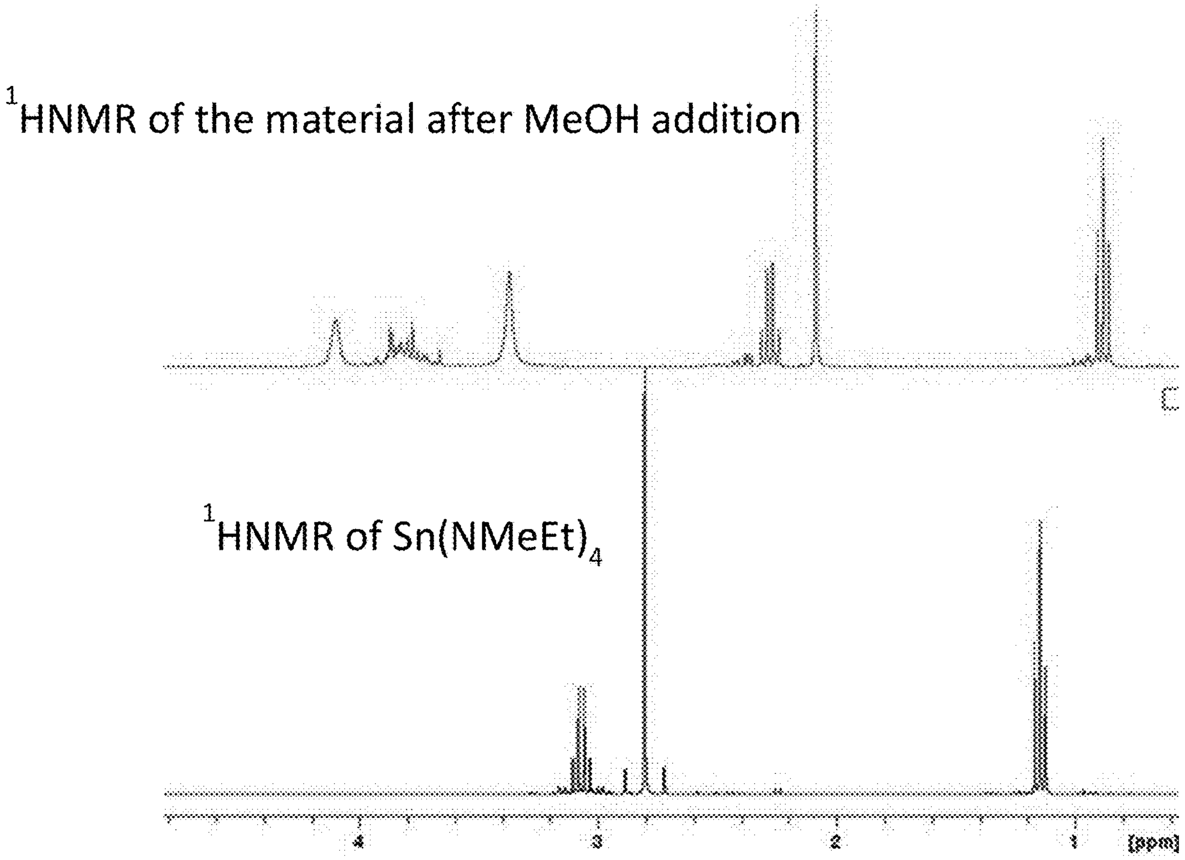
FIG. 8 shows $^1H$ NMR spectra of $Sn(NMeEt)_4$ prior and after the addition of MeOH.

In a further test, methanol was added to $Sn(NMeEt)_4$. This also caused an instantaneous exothermic reaction. FIG. 8 shows $^1H$ NMR spectra of $Sn(NMeEt)_4$ prior and after the addition of MeOH. As shown in FIG. 8, the final product shows release of HNMeEt, and full consumption of the starting material.

Example 18: Thermal Stability Test

Thermal stability tests of $Sn(NMeEt)_4$ were carried out in stainless steel ampoules, which were stored at fixed temperatures of 60° C., 100° C., and 125° C. for a number of weeks. NMR was performed to see if there had been any thermal decomposition. A visual check was also used, looking for solid formation after storage.

Figure 9:
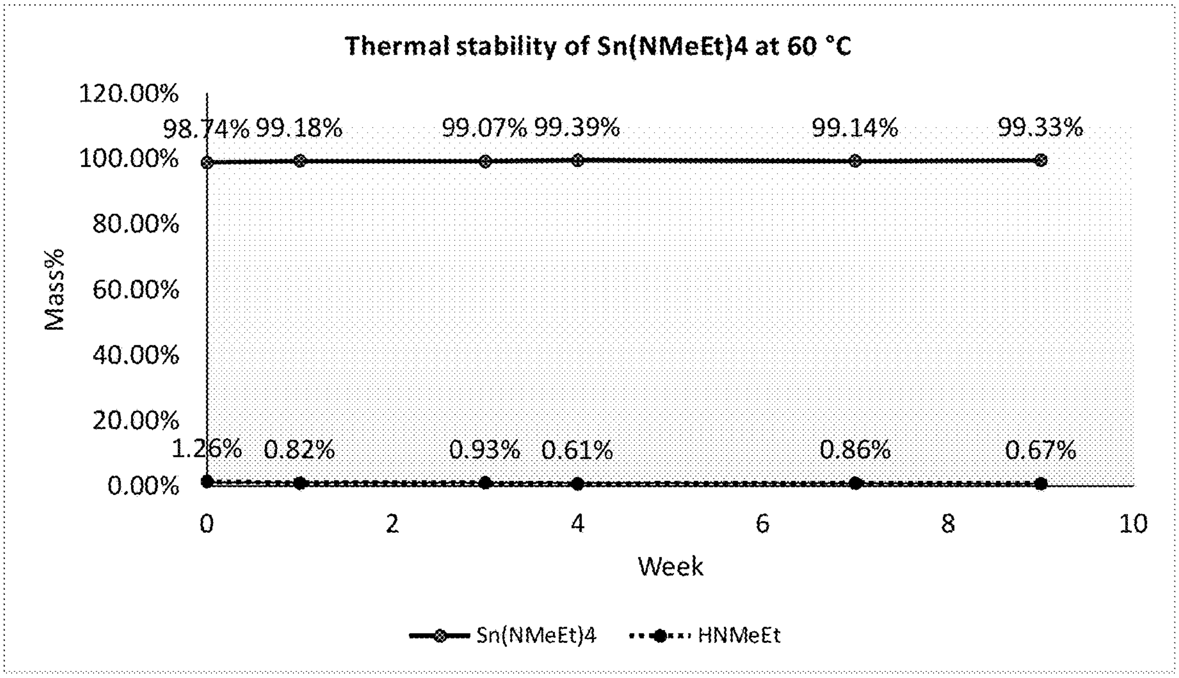
FIG. 9 is a graph of mass % versus weeks at a storage temperature of 60° C. of $Sn(NMeEt)_4$ compared to HNMeEt.
Figure 10:
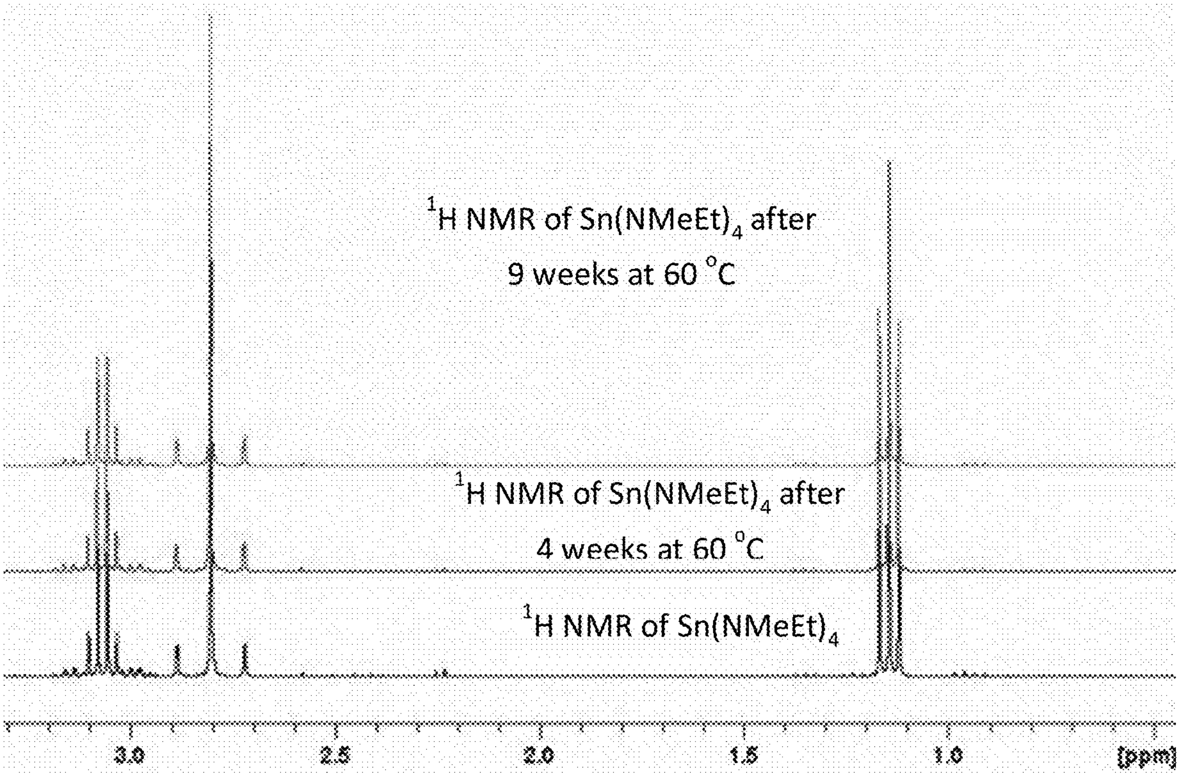
FIG. 10 shows $^1H$ NMR spectra of $Sn(NMeEt)_4$ samples at 60° C. at 0, 4, and 9 weeks.

$Sn(NMeEt)_4$ remained stable at 60° C. Specifically, FIG. 9 shows the mass % of $Sn(NMeEt)_4$ compared to mass % of HNMeEt to show the stability of $Sn(NMeEt)_4$ at the a storage temperature of 60° C. FIG. 10 shows $^1H$ NMR spectra of $Sn(NMeEt)_4$ samples at 60° C. at 0, 4, and 9 weeks.

Figure 11:
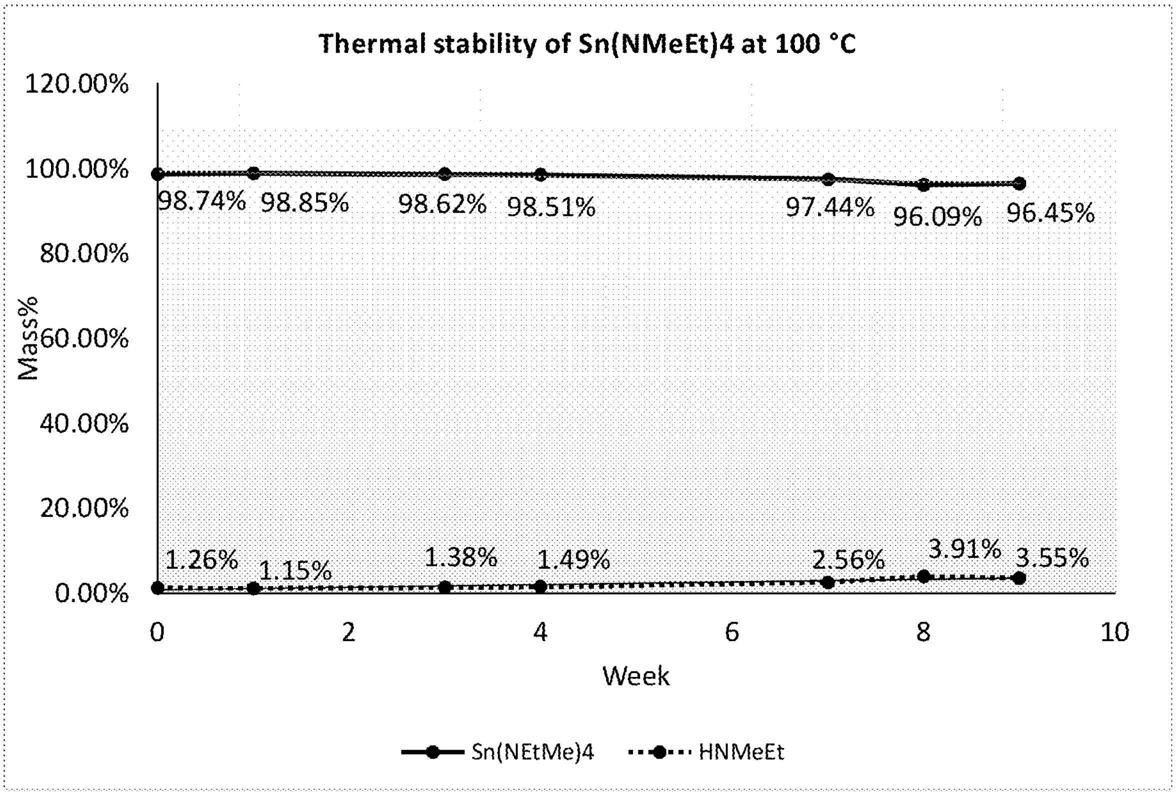
FIG. 11 is a graph of mass % versus weeks at a storage temperature of 100° C. of $Sn(NMeEt)_4$ compared to HNMeEt.
Figure 12:
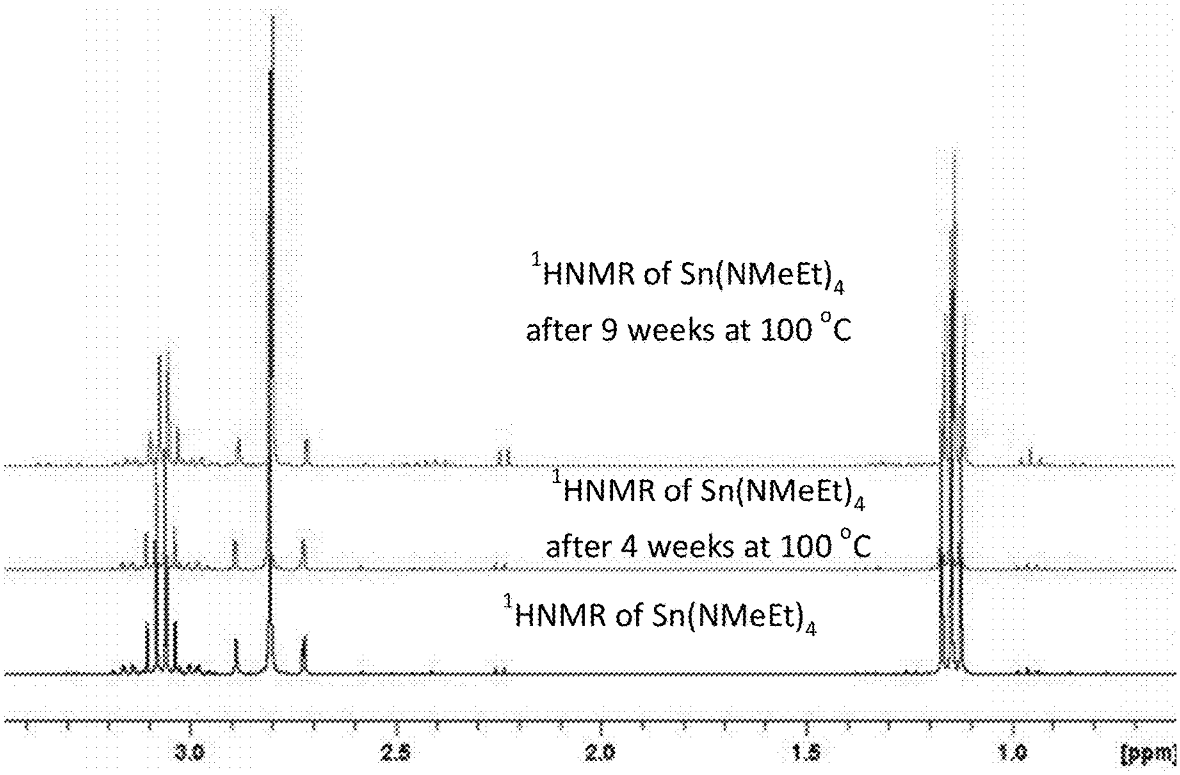
FIG. 12 shows $^1H$ NMR spectra of $Sn(NMeEt)_4$ samples at 100° C. at 0, 4, and 9 weeks.

$Sn(NMeEt)_4$ showed little decomposition at 100° C. Specifically, FIG. 11 shows the mass % of $Sn(NMeEt)_4$ compared to mass % of HNMeEt to show the stability of $Sn(NMeEt)_4$ at the a storage temperature of 100° C. FIG. 12 shows $^1H$ NMR spectra of $Sn(NMeEt)_4$ samples at 100° C. at 0, 4, and 9 weeks.

Figure 13:
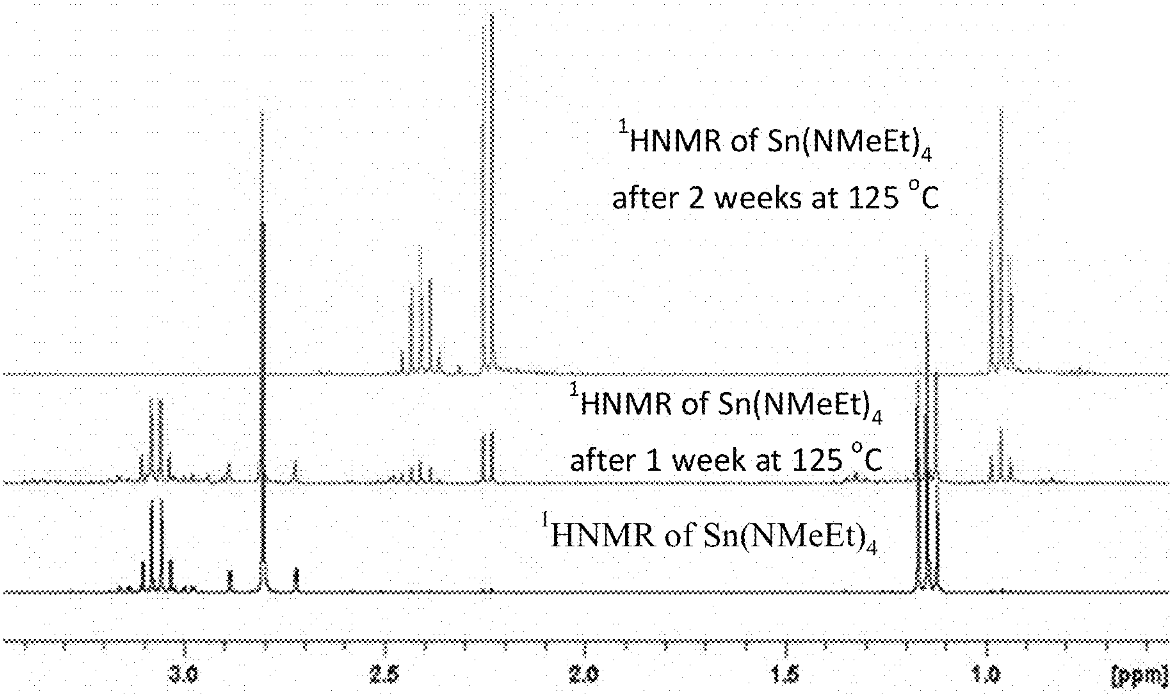
FIG. 13 shows $^1H$ NMR spectra of $Sn(NMeEt)_4$ samples at 125° C. at 0, 1, and 2 weeks.

$Sn(NMeEt)_4$ fully decomposed after 2 weeks at 100° C. Specifically, FIG. 13 shows $^1H$ NMR spectra of $Sn(NMeEt)_4$ samples at 125° C. at 0, 1, and 2 weeks.

Also, higher vapor pressure allows for minimal heating of the chemical to allow for vapor delivery to the CVD/ALD chamber. Lower volatility materials are heated to a higher temperature to reach a desired vapor pressure for physical delivery to the chamber. As temperature increases, the chance of thermal decomposition increases. The goal for any precursor is to deliver at a high enough vapor pressure, but without inducing thermal decomposition of the material. FIG. 1 shows different vapor pressures for a number of compounds useable in forming tin oxide films.

It was also found that keeping a single reactant compound stable during storage is difficult. Specifically, reactant compounds used for depositing tin oxide films are found to disproportionate over time. To stop dimer formation in such compounds, it was found that an additive. Specifically, a second organometallic compound selected from compounds represented by Formula IV: $Sn(NR^4{}_2)_4$ is found to provide the ability to stop the dimer formation for tin compounds used for depositing tin oxide films. In particular compounds included in Formula IV, each $R^4$ group is independently selected from the group consisting of an alkyl or aryl group having from 1 to 10 carbon atoms.

Compounds of Formula IV include those in which each $R^4$ group is an independently selected alkyl group having from 1 to 10 carbon atoms. It is contemplated that each $R^4$ group may be an independently selected alkyl group having from 1 to 6 carbon atoms. Particularly, each $R^4$ group is an independently selected alkyl group having from 1 to 4 carbon atoms. More particularly, each $R^4$ group is independently selected from the group consisting of methyl, ethyl, propyl, iso-propyl, tert-butyl, iso-butyl and n-butyl. Also, for some compounds, each $R^4$ group may represent different alkyl, acyl, or aryl groups, in particular different alkyl groups.

Particular organometallic compounds of Formula IV include the following: $Sn(NMe_2)_4$, $Sn(NEt_2)_4$, and $Sn(NMeEt)_4$.

Organometallic compounds that may benefit from the addition of the second organometallic compound of Formula IV include compounds represented by Formula III: $R^3{}_2Sn(NR^{3\prime}{}_2)_2$, wherein:

each $R^3$ group is independently selected from the group consisting of an alkyl or aryl group having from 1 to 10 carbon atoms;

each $R^{3'}$ group is independently selected from the group consisting of an alkyl or aryl group having from 1 to 10 carbon atoms.

Compounds of Formula I include those in which each $R^3$ group and each $R^{3'}$ group is an independently selected alkyl group having from 1 to 10 carbon atoms. It is contemplated that each $R^3$ group and each $R^{3'}$ group may be an independently selected alkyl group having from 1 to 6 carbon atoms. Particularly, each $R^3$ group and each $R^{3'}$ group is an independently selected alkyl group having from 1 to 4 carbon atoms. More particularly, each $R^3$ group and each $R^{3'}$ group is independently selected from the group consisting of methyl, ethyl, propyl, iso-propyl, tert-butyl, iso-butyl and n-butyl. Also, for some compounds, each $R^3$ group and each $R^{3'}$ group may represent different alkyl, acyl, or aryl groups, in particular different alkyl groups.

Example 19: Disproportionation Testing

Figure 2:
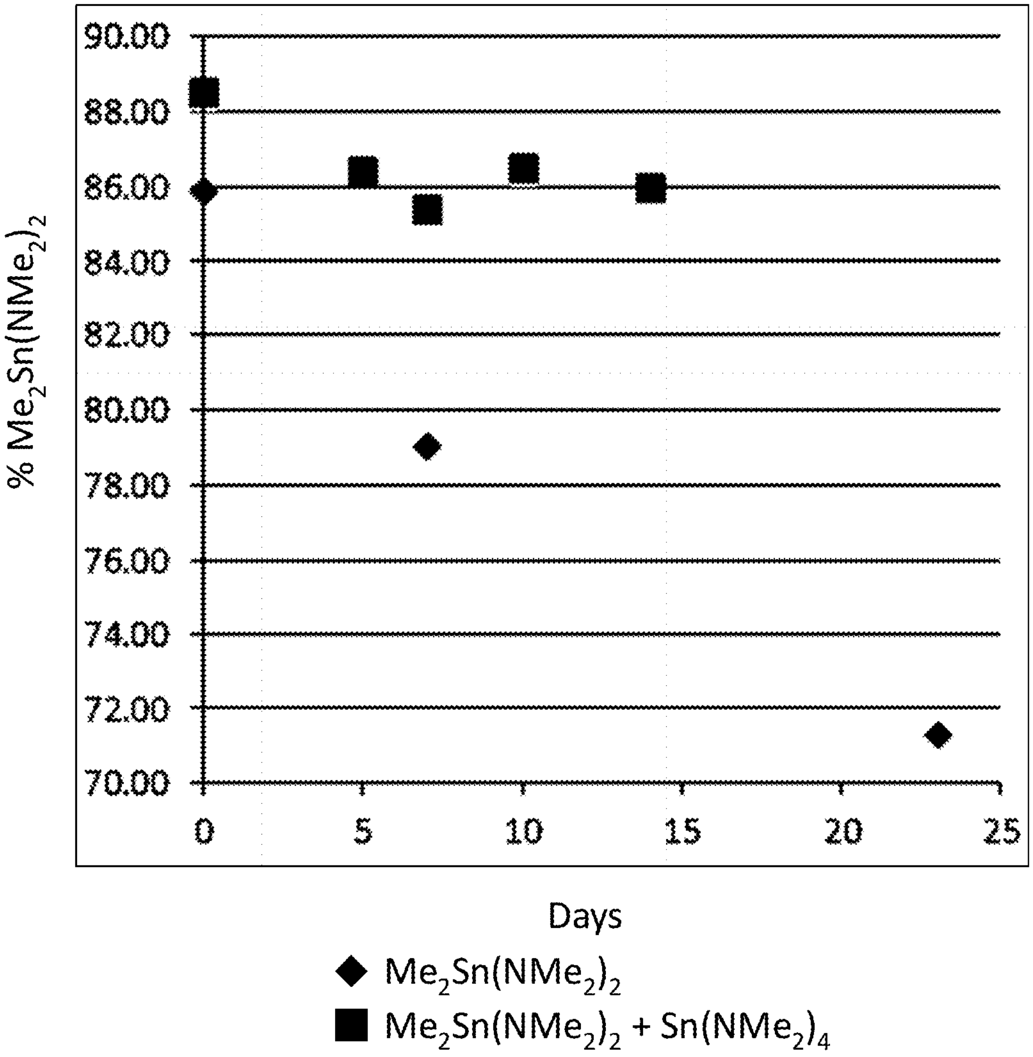
FIG. 2 is a graph of mass % versus days at a storage temperature of 70° C. of $Me_2Sn(NMe_2)_2$.

Disproportionation stability tests of $Me_2Sn(NEtMe)_2$ with or without $Sn(NMe_2)_4$ were carried out in stainless steel containers, which were stored at a fixed temperature of 70° C. for a number of days. NMR was performed to determine the mass % of $Me_2Sn(NEtMe)_2$ at different times during storage to see if there had been any disproportionation. For the comparison, $Me_2Sn(NEtMe)_2$ was stored by itself in one container and $Me_2Sn(NEtMe)_2$ with an addition of 10 mol % Sn(NMe2)4 was stored in another container. FIG. 2 is a graph showing the rate of disproportionation for $Me_2Sn(NMe_2)_2$ alone versus $Me_2Sn(NMe_2)_2$ in a mixture with $Sn(NMe_2)_4$.

Results of the testing show a substantial improvement in storage stability with disproportionation mostly stopped when $Sn(NMe_2)_4$ was added, as shown in FIG. 6.

In some cases, etching of deposited tin oxide films are desired. Further, as mentioned above, the deposition chambers used to form tin oxide films need to be cleaned, which involves removing tin oxide films formed on the interior surfaces of the reactor chamber. It is desired to use dry etching processes both to etch tin oxide films formed on substrates, and to remove unwanted tin oxide films from the interior surfaces of the reactor chamber. However, for reasons listed above, dry etching tin oxide has proven to be difficult. However, dry etching processes disclosed herein solve these problems. Example embodiments of the dry etching processes are provided below.

In use, the dry etching process includes heating the entire reactor chamber to an elevated temperature of greater than 100° C., for example between 100° C. and 900° C., and providing an etchant gas from a gas source coupled to the reactor chamber. More particularly, for embodiments of thermal etching in quartz CVD/ALD furnaces the elevated temperature is between 400° C. and 900° C., while for embodiments of plasma etching in aluminum, stainless steel, or ceramic ALD chambers the elevated temperature is between 100° C. and 400° C. The etchant gas flows through the reactor chamber, before being evacuated together with any produced reaction products and pumped out through a gas evacuation line. The gas pressure in the reactor chamber is typically maintained at between 0.1 mBar and 1000 mBar (atmospheric pressure), but can be as high as 1500 mBar, during the dry etching cycle.

In embodiments, the etchant gas is activated to enhance the generation of free radicals, and thereby to enhance the etching process. This may be achieved by thermal activation, ultraviolet (UV) excitation, or plasma discharge. The etchant gas enters the activation chamber. Within the activation chamber, a volume of gas is exposed to an activation energy source, such as a heater (thermal activation), a UV lamp (UV activation) or an ionizing RF field (plasma activation). Thermal activation may be effected by heating of the MOVPE (metalorganic vapor phase epitaxy) reactor vessel, or the etchant gas may be pre-heated in a heating chamber prior to injection into the reactor vessel. In the case of UV or plasma discharge activation the etchant gas is activated in an activation chamber by exposure to UV light or radio frequency plasma discharge prior to injection into the reactor vessel. The activated gas exits the activation chamber through an outlet, and passes into the MOCVD (metalorganic chemical vapor deposition) reactor chamber.

The etchant gas is of the general formula $A^3OX_2$, wherein $A^3$ is C, N, or S; O is oxygen; and each X is independently selected from halogens. For example, the etchant gas may include a carbonyl, thionyl, or nitrosyl group (CO, SO, or NO) combined with a halogen (i.e., chlorine, bromine, or iodine (Cl, Br, or I)). $COCl_2$, $COBr_2$, $COI_2$, $SOI_2$, $SOCl_2$, $SOBr_2$, $SO_2Cl_2$, $SO_2Br_2$, NOCl, NOBr, NOI, SOClBr, SOClF, and SOFBr are examples of suitable etchant gases. The etchant gas may be derived from the neat material, or may alternatively be generated by a combination of separate components, such as CO, SO, $SO_2$, or NO mixed with $Cl_2$, $Br_2$, or $I_2$. The etchant gas may be mixed with a carrier gas such as argon, nitrogen, or hydrogen. The etchant gas or its components may be supplied directly from one or more gas cylinders, in the case of etchant constituents that are available in the gaseous state. In the case of etchant gas constituents that are normally in a liquid state, the required gaseous state can be achieved by bubbling the carrier gas through a container with the liquid etchant component, volatilizing the liquid constituents into the etchant, thereby producing a mixture of carrier gas and etchant vapor. Alternatively, the liquid chemical constituents may be heated until they vaporize, at which point the vapor is combined with a carrier gas, if necessary, and introduced into the reactor chamber. The etchant gas may contain additional amounts of halogen to enhance etching. The etchant gas may contain additional amounts of methyl halide, hydrogen halide or other halogen compounds to enhance etching.

Within the reaction chamber the etchant gas reacts with metal containing deposits to form volatile metal halides which are removed with the purging of the etchant gas. A typical reaction involves the reaction of the metallic oxide with the purge gas to form metallic halide with the residual oxygen combining with the carbonyl/thionyl/nitrosyl group. For example:

$$Ga_2O_3+3SOBr_2\rightarrow 2GaBr_3+3SO_2$$

$$2Ga_2O_3+6SOBrCl\rightarrow GaClBr_2+GaBrCl_2+GaCl_3+GaBr_3+6SO_2$$

$$Ga_2O_3+3NOBr\rightarrow GaBr_3+3NO_2$$

$$SnO_2+2SOCl_2\rightarrow SnCl_4+2SO_2$$

Other metal containing deposits also react to form metal halides; the oxide is given as an example of the most difficult deposit to remove due to the strong affinity of the metal for oxygen.

Once the metallic halide is formed, it must be removed from the reaction chamber. One way to do so is to reduce the pressure in the chamber to mobilize the halides for removal from the reactor chamber. Another option, which may be used alone or in combination with a reduced chamber pressure, is to heat the chamber to a temperature sufficient to evaporate or sublimate the halide.

It is has been discovered that $COCl_2$ may be especially useful as an etchant gas to remove tin oxide and other difficult to remove metal oxides. However, phosgene gas ($COCl_2$) is an incredibly dangerous nerve agent. Accordingly, it has been determined that adding a gas mixture of $SOCl_2$ or NOCl with CO or $CO_2$ can achieve a similar etch function as $COCl_2$ without the chemical danger associated with $COCl_2$.

In further embodiments, the etchant gas includes an additive to enhance etch rate, etch selectivity, or lifetime of the byproducts. Such an additive can include a carbon or hydrogen containing gas, such a gas of the general formula $C_xH_yO_z$, wherein x, y, z are numbers from 0 to 10.

In further embodiments, the etchant gas may also contain a dilution additive or carrier to enhance etch rate, etch selectivity, or lifetime of the byproducts. Such additives can include relatively inert gases such as $N_2$, Ar, He, Ne.

The processes disclosed herein enable etching of $SnO_2$ and other metal oxides selective to quartz, oxides, ceramics, aluminum and other materials at low temperature.

Further, the processes disclosed herein using the disclosed etchant gases form reaction byproducts that are more volatile than byproducts caused by hydrogen containing molecules, and thus the reaction byproducts can be more easily evacuated from the chamber before they redeposit on the chamber walls.

The processes disclosed herein are also less aggressive and do not attack aluminum surfaces compared to processes utilizing $Cl_2$ as the etchant, as shown in the following example:

Example 20

Figure 3:
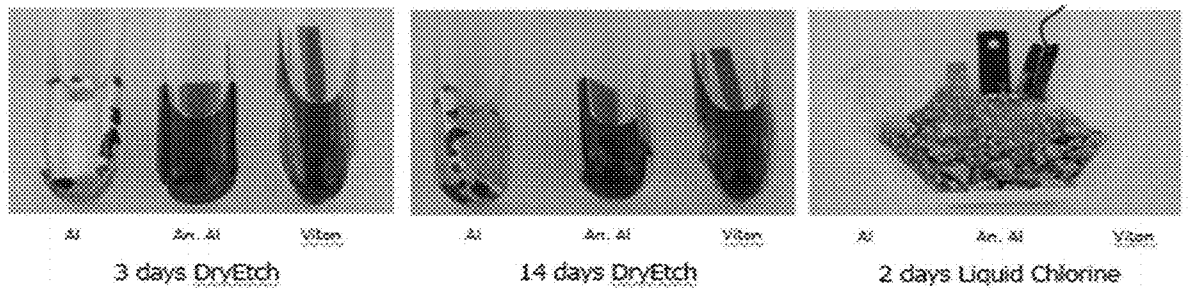
FIG. 3 are photographs of the resulting coupons after testing according to Example 21.

Aluminum, anodized aluminum, and Viton coupons were immersed in 1.5 g $SOCl_2$ at 60° C. and showed no signs of change after two weeks. Some brown solid was loosely adhered to the aluminum coupon, but the aluminum surface itself was not impacted and no further solid was observed after the first few days. Separately, three identical coupons as above were sealed in a stainless steel ampoule with 3 grams of liquid chlorine and held at 60° C. for two days. Little change was observed to the anodized aluminum. However, very little aluminum remained. It was substantially converted to yellow-beige solid. Viton had greatly diminished tensile strength and separated easily into two pieces when it was pulled from the mass of yellow-beige solid. Photographs of the results described above are provided in FIG. 3.

Example 21: Power Effect on $SnO_2$ Etch Rate at 26° C. and 75° C.

Figure 4:
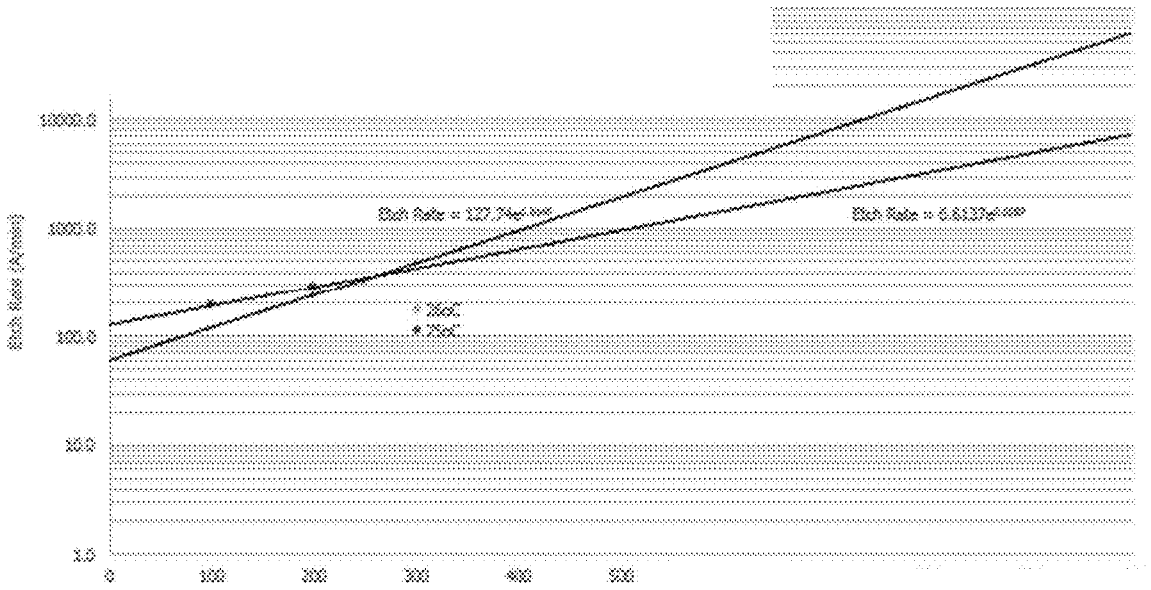
FIG. 4 is a graph of the etch rate in A/min to power in W of the runs according to Example 22.
Figure 5:
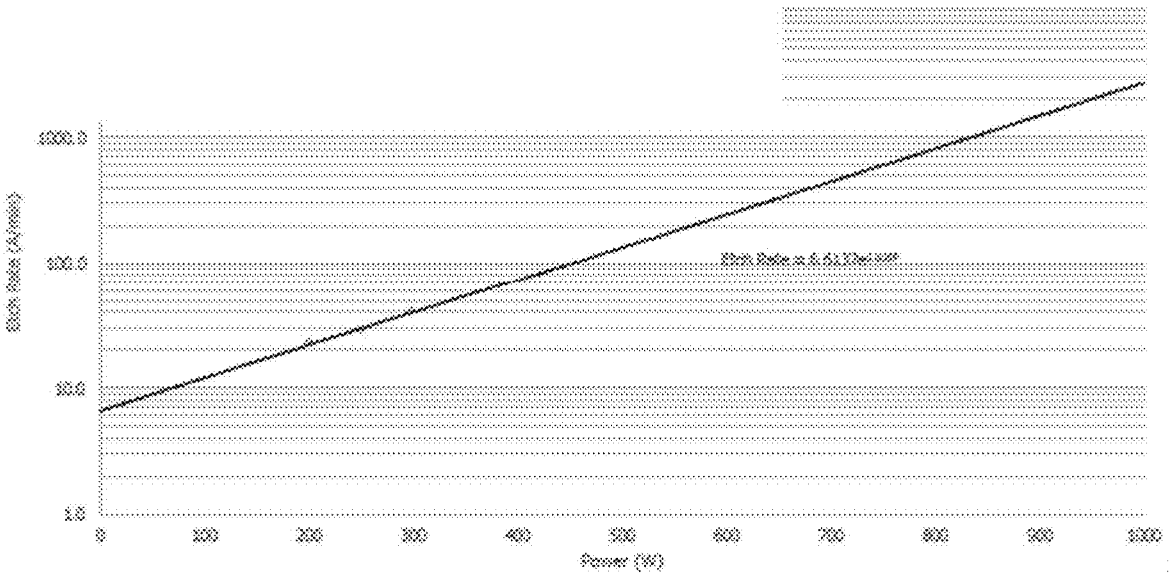
FIG. 5 is a graph of the etch rate in A/min to Power in W of only the runs in which the temperature was at 26° C. according to Example 22.

Etching of a substrate having an exposed layer of $SnO_2$ on Si was performed. The substrate was provided at 50° C. and 330 Å. Each of the runs at 26° C. had an etch time of 60 seconds, while each of the runs at 75° C. had an etch time of 30 seconds. Each of the runs included a flowrate of 2 sccm (vapor draw), and pressure set at 350 mTorr (0.467 mBar). A graph of the etch rate in Å/min to power in W of the runs are shown in FIG. 4. Also, Figure. 5 is a graph of the etch rate in A/min to Power in W of only the runs in which the temperature was at 26° C.

As shown by the results, power causes an exponential increase in etch rate in SnO2. Power effect on etch rate increase is similar between SnO2 and SiO2 at ambient temperature. However, no etching of SiO2 was seen at 100 W at 75° C. Further, selectivity for SnO2 etching at 26° C. at lower pressure 350 mTorr (0.467 mBar) is about 13:1, while it is 3:1 at 1 Torr (1.333 mBar).

Example 22: Etch Rate of $SnO_2$ Films at 300 W and 26° C.

Etching of a substrate having an exposed layer of $SnO_2$ on Si was performed. The substrate was provided at 50° C. and 330 Å. Each of the runs included a temperature of 26° C., a flowrate of 2 sccm (vapor draw), pressure set at 350 mTorr (0.467 mBar), and power at 300 W. Only the run time differed between runs, with the differing resulting etch rates provided below in Table 1.

TABLE 1

| Run Time (sec) | Etch Rate (Å/min) |
|---|---|
| 0 | 0.0 |
| 30 | 488.8 |
| 45 | 495.1 |

Example 23: Power Effect on $SnO_2$ Etch Rate at 26° C.

Etching of a substrate having an exposed layer of $SnO_2$ on Si was performed. The substrate was provided at 50° C. and 330 Å. Each of the runs included a temperature of 26° C., a flowrate of 2 sccm (vapor draw), pressure set at 350 mTorr (0.467 mBar), and etch time of 60 seconds. Only the power differed between runs, with the differing resulting etch rates provided below in Table 2.

TABLE 2

| Power (W) | Etch Rate (Å/min) |
|---|---|
| 0 | 0.0 |
| 200 | 245.9 |
| 250 | 328.3 |
| 300 | 492.0 |

Example 24: Power Effect on $SnO_2$ Etch Rate at 75° C.

Etching of a substrate having an exposed layer of $SnO_2$ on Si was performed. The substrate was provided at 50° C. and 330 Å. Each of the runs included a temperature of 75° C., a flowrate of 2 sccm (vapor draw), pressure set at 350 mTorr (0.467 mBar), and etch time of 30 seconds. Only the power differed between runs, with the differing resulting etch rates provided below in Table 3.

TABLE 3

| Power (W) | Etch Rate (Å/min) |
|---|---|
| 0 | 0.0 |
| 100 | 191.4 |
| 200 | 286.9 |

Example 25: Temperature Effect on $SnO_2$ Etch Rate

Etching of a substrate having an exposed layer of $SnO_2$ on Si was performed. The substrate was provided at 50° C. and 330 Å. Each of the runs included a flowrate of 2 sccm (vapor draw), pressure set at 350 mTorr (0.467 mBar), etch time of 30 seconds, and power of 200 W. Only the temperature differed between runs, with the differing resulting etch rates provided below in Table 4.

TABLE 4

| Temperature (° C.) | Etch Rate (Å/min) |
|---|---|
| 0 | 0.0 |
| 26 | 245.9 |
| 75 | 286.9 |

Multistage Distillation

From theoretical modeling of the activation energy required to strip off ligands from molecules via hydrolysis reaction, a wide range in activation energies between molecules is observed. Hence differences in reactivity are observed. This shows the likelihood that the molecule would be a highly reactive molecule for the formation of $SnO_2$ when the activation energy is low, but this value also shows that the molecule might be more prone to decomposition and reaction during the synthesis and purification processes. Accordingly, obtaining purity of compounds within the scope of Formula I and II will be difficult to obtain, especially assay purity of greater than 95% or even greater than 99%.

However, using multistage vacuum distillation can obtain greater than 95% or even greater than 99% assay purity for compounds in the scope of Formula I or II. Various forms of multistage distillation are known in the chemical manufacturing industry, but have not been employed for the purification of organometallic materials that include compounds of Formula I or II.

Figure 14:
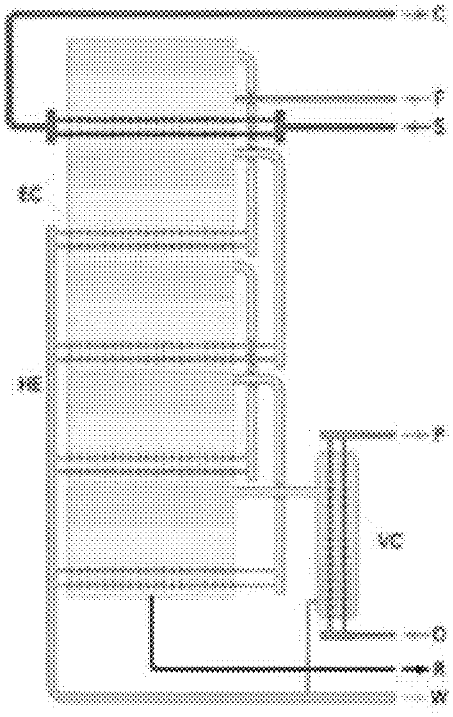
FIG. 14 shows a schematic of a multistage vacuum distillation apparatus.

As illustrated by the schematic shown in FIG. 14, multiple-effect or multistage distillation (MED) is a distillation process often used for sea water desalination. It consists of multiple stages or "effects". (In schematic in FIG. 14 the first stage is at the top. Top areas of each stage are vapor, bottom areas of each stage are liquid feed material. The material running through the pipe along the left side of the figure and in the bottom of the VC is condensate. It is not shown how feed material enters other stages than the first, however those should be readily understood. F—feed in. S—heating steam in. C—heating steam out. W—purified material (condensate) out. R—waste material out. O—coolant in. P—coolant out. VC is the last-stage cooler.) In each stage the feed material is heated by steam in tubes. Some of the feed material evaporates, and this steam flows into the tubes of the next stage, heating and evaporating more of the distillate. Each stage essentially reuses the energy from the previous stage.

The plant can be seen as a sequence of closed spaces separated by tube walls, with a heat source at one end and a heat sink at the other. Each space is at pressure below atmospheric conditions via vacuum. Each space consists of two communicating subspaces, the exterior of the tubes of stage n and the interior of the tubes in stage n+1. Each space has a lower temperature and pressure than the previous space, and the tube walls have intermediate temperatures between the temperatures of the fluids on each side. The pressure in a space cannot be in equilibrium with the temperatures of the walls of both subspaces; it has an intermediate pressure. As a result, the pressure is too low or the temperature too high in the first subspace, and the feed material evaporates. In the second subspace, the pressure is too high or the temperature too low, and the vapor condenses. This carries evaporation energy from the warmer first subspace to the colder second subspace. At the second subspace the energy flows by conduction through the tube walls to the colder next space.

Although described in connection with preferred embodiments thereof, it will be appreciated by those skilled in the art that additions, deletions, modifications, and substitutions not specifically described may be made without departure from the scope of the invention as defined in the appended claims.

What is claimed is:

1. An organometallic compound of Formula II: $Sn(NR_2(CH_2)_nA_2)_2$

Formula II

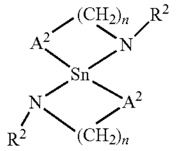

wherein:

each $A^2$ is independently selected from $NR^{2'}$ or O;

each $R^2$ group is independently selected from the group consisting of an alkyl having from 1 to 10 carbon atoms and an aryl group;

each $R^{2'}$ group is independently selected from the group consisting of hydrogen, an alkyl or acyl group having from 1 to 10 carbon atoms and an aryl group;

or when one or two of $A^2$ is $NR^{2'}$, then one or two of the $R^{2'}$ may optionally form a bond to the $R^2$ that is in the same ring as the $R^{2'}$;

n is 2 or 3;

optionally at least one of the $(CH_2)$ has one or more substitutions with an alkyl group having from 1 to 10 carbon atoms.

2. The organometallic compound of claim 1, wherein each $A^2$ is O.

3. The organometallic compound of claim 2, wherein each $R^2$ group is independently selected from the group consisting of an alkyl group having 1 to 4 carbon atoms.

4. The organometallic compound of claim 1, wherein at least one of the $CH_2$ has one or more substitutions with an alkyl group having from 1 to 10 carbon atoms.

5. The organometallic compound of claim 4, wherein only one of the $CH_2$ in each $NR^2$ $(CH_2)_nA^2$ ligand has one or more substitutions with an alkyl group having from 1 to 10 carbon atoms.

6. The organometallic compound of claim 5, wherein the only one of the $CH_2$ in each amine has two substitutions with methyl or ethyl.

7. The organometallic compound of claim 1, wherein each $A^2$ is N and Formula II is represented by Formula IIb:

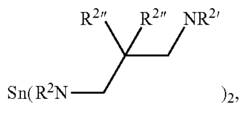

wherein each $R^{2''}$ group and each $R^{2'''}$ group is an independently selected alkyl group having 1 to 10 carbon atoms.

8. The organometallic compound of claim 7, wherein each $R^{2''}$ group and each $R^{2'''}$ group is methyl or ethyl.

9. The organometallic compound of claim 4, wherein each $R^2$ group and each $R^{2'}$ group is independently selected from the group consisting of an alkyl group having 1 to 4 carbon atoms.

10. The organometallic compound of claim 4, wherein each $R^{2'}$ group is hydrogen.

11. The organometallic compound of claim 1, wherein one or two of $A^2$ is $NR^{2'}$ and at least one $R^{2'}$ forms a bond to the $R^2$ that is in the same ring as the $R^{2'}$.

12. The organometallic compound of claim 11, wherein the organometallic compound of Formula II is $Sn(N_2C_4H_8)_2$:

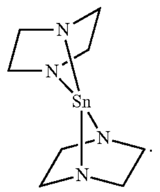 [SMILES: C1C[N]2CC[N]1[Sn]21[N]2CC[N]1CC2]

13. The organometallic compound of claim 1, wherein each $(NR^2(CH_2)_nA^2)$ is selected from the group consisting of N,N'-dimethylethylenediamine ($NMe(CH_2)_2NMe$), piperazine ($N_2C_4H_8$), N,N'-diethylethylenediamine ($NEt(CH_2)_2NEt$), N,N'-diisopropylethylenediamine ($NiPr(CH_2)_2NiPr$), N,N'-di-tert-butylethylenediamine ($NtBu(CH_2)_2NtBu$), N,N'-dimethyl-1,3-propanediamine ($NMe(CH_2)_3NMe$), 2-(methylamino)ethanol ($NMe(CH_2)_2O$), and 2-(ethylamino)ethanol ($NEt(CH_2)_2O$).

* * * * *